United States Patent
Li et al.

(10) Patent No.: US 9,215,627 B2
(45) Date of Patent: Dec. 15, 2015

(54) HANDOVER METHOD AND DEVICE

(71) Applicant: Huawei Technologies Co., LTD, Shenzhen (CN)

(72) Inventors: Yi Li, Shanghai (CN); Yuliang Zhi, Tianjin (CN); Zongquan Tang, Toronto (CA); Hai Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 14/159,172

(22) Filed: Jan. 20, 2014

(65) Prior Publication Data

US 2014/0133460 A1 May 15, 2014

Related U.S. Application Data

(63) Continuation of application No. PCT/CN2012/078938, filed on Jul. 20, 2012.

(30) Foreign Application Priority Data

Jul. 20, 2011 (CN) .......................... 2011 1 0203837

(51) Int. Cl.
*H04W 36/00* (2009.01)

(52) U.S. Cl.
CPC ...... *H04W 36/0022* (2013.01); *H04W 36/0066* (2013.01)

(58) Field of Classification Search
None
See application file for complete search history.

(56) References Cited

U.S. PATENT DOCUMENTS

| 2007/0041360 | A1* | 2/2007 | Gallagher et al. ............. 370/352 |
| 2010/0105386 | A1* | 4/2010 | Guo ........................... 455/435.1 |
| 2011/0165902 | A1  | 7/2011 | Demarez et al. |
| 2013/0142168 | A1* | 6/2013 | Vedrine et al. ................. 370/331 |
| 2013/0163563 | A1* | 6/2013 | Sha et al. ...................... 370/331 |

FOREIGN PATENT DOCUMENTS

| CN | 101686515 A | 3/2010 |
| CN | 102077649 A | 5/2011 |
| EP | 2141951 A1  | 1/2010 |

OTHER PUBLICATIONS

3rd Generation Partnership Project; Technical Specification Group Radio Access Network; UTRAN Iu interface Radio Access Network Application Part (RANAP) signalling (Release 10), 3GPP TS 25.413 V10.2.0, Jun. 2011, 425 pages.
International Search Report and Written Opinion received in Application No. PCT/CN2012/078938 mailed Nov. 22, 2012, 10 pages.
ZTE, "RNC ID issue," 3GPP TSG-RAN WG2 Meeting#72. R2-106172, Jacksonville, USA, Nov. 15-19, 2010, 3 pages.
Supplementary European Search Report received in EP 12 81 5237, mailed Jun. 12, 2014, 7 pages.

(Continued)

*Primary Examiner* — Gary Mui
(74) *Attorney, Agent, or Firm* — Slater & Matsil, L.L.P.

(57) ABSTRACT

Embodiments of the present invention provide a handover method and device. When an SGSN cannot identify a Target eNB ID, the Target eNB ID is converted into a Corresponding RNC ID. A relocation request message carrying the Corresponding RNC ID is sent to the SGSN. One of a first PLMN ID and a second PLMN ID included in the Target eNB ID is selected. A selected PLMN ID, an eNB ID included in the Target eNB ID, and a TAC in a Selected TAI are filled in the Corresponding RNC ID.

36 Claims, 13 Drawing Sheets

(56) References Cited

OTHER PUBLICATIONS

3GPP TS 23.401 V8.2.0 (Jun. 2008), 3rd Generation Partnersip Project; Technical Specificatin Group Services and System Aspects; General Packet Radio Service (GPRS) enhancements for Evolved Universal Terrestrial Radio Access Network (E-Utran) access (Release8), Jun. 2008, 182 pages.

Huawei: "Kenb handling during inter-RAT handover," SA WG3 Temporary Document, 3GPP TSG SA WG3 Security—S3#51, Apr. 14-18, 2008, 4 pages.

* cited by examiner

HANDOVER METHOD AND DEVICE

This application is a continuation of International Application No. PCT/CN2012/078938, filed on Jul. 20, 2012, which claims priority to Chinese Patent Application No. 201110203837.2, filed on Jul. 20, 2011, both of which are hereby incorporated by reference in their entireties.

TECHNICAL FIELD

Embodiments of the present invention relate to the field of communication technologies and, in particular embodiments, to a handover method and device.

BACKGROUND

In a mobile communication system, a handover is a process for switching from an original radio channel to a new radio channel when a UE (user equipment) moves from a coverage area of a BS (base station) to a coverage area of another BS during a period when the UE communicates with a network side.

Currently, in a UMTS (universal mobile telecommunications system) system, the handover is classified into an intra-system handover and an inter-system handover. The intra-system handover refers to that both an original cell used by the UE and a target cell to which the UE is handed over are cells in the UMTS system. The inter-system handover refers to a handover between a cell in the UMTS system and a cell in other radio system. In the prior art, an inter-system handover between the UMTS system, a GSM (global systems for mobile communication) system, and an LTE (long term evolution) system is supported.

LTE is a next-generation mobile communication standard which is being formulated currently by the 3GPP (3rd generation partnership project), aiming to provide a low-cost network which can lower network delay, increase a data rate and improve system capacity and coverage. In an overlapping coverage area or at a junction between a UMTS network and an LTE network, to better meet user demands, a user in the UMTS system may be migrated to the LTE system through the inter-system handover.

A UMTS-to-LTE system handover process mainly involves network entities, such as an RNC (radio network controller), an SGSN (serving GPRS support node), an MME (mobility management entity), an eNB (evolved Node B) and so on. An important step is that a source node RNC correctly sends a handover request to a target node eNB through a core network.

When determining to hand over a UE to the LTE network, the RNC sends a relocation required message to an SGSN, which includes a parameter and a Target ID (a target node identity) of the inter-system handover. Then, the SGSN forwards, according to the Target ID identity in the message, the handover request to a target MME through a forward relocation request message. The target MME then determines a target eNB according to the Target ID identity in the Forward Relocation Request message, and sends a handover request message to the target eNB to request establishment of required handover resources.

The Target ID in the foregoing message is a basis on which the SGSN addresses the target MME and the target MME addresses the target eNB. According to a different target system of a handover, the Target ID is classified into a Target RNC ID (target radio network controller identity), a Cell Global ID (cell global identity) and a Target eNB ID (target long term evolution base station identity). The Target RNC ID is used for a UMTS-to-UMTS handover, the Cell Global ID is used for a UMTS-to-GSM handover, and the Target eNB ID is used for a UMTS-to-LTE handover.

In a UMTS-to-LTE system handover, the Target ID needs to be set to the Target eNB ID. However, in an existing network, an SGSN that cannot identify the Target eNB ID exists. Therefore, the RNC may first convert a target node Target eNB ID into a Target RNC ID (called Corresponding RNC ID), and then the target MME restores the Corresponding RNC ID to a real Target eNB-ID according to a corresponding conversion rule. Through this kind of conversion strategy, the SGSN and the target MME can correctly forward a handover request to a target eNB node.

However, currently, there is still no rule for converting the Target eNB ID and the Corresponding RNC ID.

SUMMARY OF THE INVENTION

Embodiments of the present invention provide a handover method and device, which can convert a Target eNB ID and a Corresponding RNC ID.

In one aspect, a method for a handover from a universal mobile telecommunications system UMTS to long term evolution LTE is provided. When a serving general packet radio service support node SGSN cannot identify a target long term evolution base station identity Target eNB ID, the Target eNB ID is converted into a corresponding radio network controller identity Corresponding RNC ID. A relocation required message is sent to the SGSN. The relocation required message carries the Corresponding RNC ID.

Converting the Target eNB ID into the Corresponding RNC ID includes selecting one of a first public land mobile network identity PLMN ID and a second PLMN ID included in the Target eNB ID and filling, in the Corresponding RNC ID, a selected PLMN ID, a long term evolution base station identity eNB ID included in the Target eNB ID, and a tracking area code TAC in a selected tracking area identity Selected TAI included in the Target eNB ID.

In another aspect, a method for a handover from a universal mobile telecommunications system UMTS to long term evolution LTE is provided. A relocation request message is sent by a radio network controller. The relocation request message carries a corresponding radio network controller identity Corresponding RNC ID. The Corresponding RNC ID is obtained by converting a target long term evolution base station identity Target eNB ID and carries a selected public land mobile network identity PLMN ID, a long term evolution base station identity eNB ID included in the Target eNB ID, and a tracking area code TAC in a selected tracking area identity Selected TAI included in the Target eNB ID. The selected PLMN ID is one of a first PLMN ID and a second PLMN ID included in the Target eNB ID. A target mobility management entity MME is selected according to the Corresponding RNC ID. A forward relocation request message is sent to the addressed target MME. A target identity Target ID in the forward relocation request message carries information of the Corresponding RNC ID.

In another aspect, a method for a handover from a universal mobile telecommunications system UMTS to long term evolution LTE is provided. A forward relocation required message is sent by a serving general packet radio service support node SGSN. It is determined whether a target identity Target ID in the forward relocation required message is a corresponding radio network controller identity Corresponding RNC ID. The Corresponding RNC ID is obtained by converting a first target long term evolution base station identity Target eNB ID and carries a selected public land mobile network identity PLMN ID, a long term evolution base station identity eNB ID included in the Target eNB ID, and a tracking area code TAC in a selected tracking area identity Selected TAI included in the Target eNB ID. The selected PLMN ID is one of a first PLMN ID and a second PLMN ID included in the Target eNB ID. When it is determined that the Target ID is the Corresponding RNC ID, a restored Target eNB ID is obtained according to the Corresponding RNC ID. A target eNB is addressed according to the restored Target eNB ID, and sending a handover request message to the addressed target eNB.

In another aspect, a radio network controller is provided. A converting unit is configured to, when a serving general packet radio service support node SGSN cannot identify a target long term evolution base station identity Target eNB ID, convert the Target eNB ID into a corresponding radio network controller identity Corresponding RNC ID. A sending unit is configured to send a relocation required message to the SGSN. The relocation required message carries the Corresponding RNC ID. The converting unit includes a selecting module, which is configured to select one of a first public land mobile network identity PLMN ID and a second PLMN ID included in the Target eNB ID and a filling module, which is configured to fill, in the Corresponding RNC ID, the selected PLMN ID, a long term evolution base station identity eNB ID included in the Target eNB ID, and a tracking area code TAC in a selected tracking area identity Selected TAI included in the Target eNB ID.

In another aspect, a serving general packet radio service support node SGSN device includes a receiving unit, configured to receive a relocation request message sent by a radio network controller. The relocation request message carries a corresponding radio network controller identity Corresponding RNC ID. The Corresponding RNC ID is obtained by converting a target long term evolution base station identity Target eNB ID and carries a selected public land mobile network identity PLMN ID, a long term evolution base station identity eNB ID included in the Target eNB ID, and a tracking area code TAC in a selected tracking area identity Selected TAI included in the Target eNB ID, and the selected PLMN ID is one of a first PLMN ID and a second PLMN ID included in the Target eNB ID. A requesting unit is configured to address a target mobility management entity MME according to the Corresponding RNC ID and to send a forward relocation request message to the addressed target MME. A target identity Target ID in the forward relocation request message carries information of the Corresponding RNC ID.

In another aspect, a mobility management entity MME device includes a receiving unit, which is configured to receive a forward relocation request message sent by a serving general packet radio service support node SGSN. A determining unit is configured to determine whether a target identity Target ID in the forward relocation request message is a corresponding radio network controller identity Corresponding RNC ID. The Corresponding RNC ID is obtained by converting a first target long term evolution base station identity Target eNB ID and carries a selected public land mobile network identity PLMN ID, a long term evolution base station identity eNB ID included in the Target eNB ID, and a tracking area code TAC in a selected tracking area identity Selected TAI included in the Target eNB ID, and the selected PLMN ID is one of a first PLMN ID and a second PLMN ID included in the Target eNB ID. A restoring unit is configured to obtain a restored Target eNB ID according to the Corresponding RNC ID when the determining unit determines that the Target ID is the Corresponding RNC ID. A requesting unit configured to address a target eNB according to the restored Target eNB ID, and send a handover request message to the addressed target eNB.

In the embodiments of the present invention, when the Target eNB ID is converted, a PLMN ID in the Target eNB ID is discarded, so that bits to be converted can be admitted into the Corresponding RNC ID, and conversion between the Target eNB ID and the Corresponding RNC ID can be implemented.

BRIEF DESCRIPTION OF THE DRAWINGS

To describe the technical solutions in the embodiments of the present invention more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
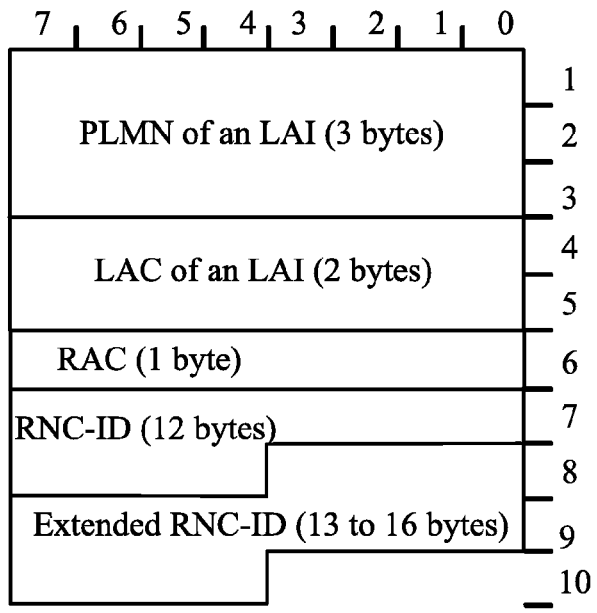
FIG. 1 is a schematic diagram of a Target RNC ID.

FIG. 1 is a schematic diagram of a Target RNC ID. As shown in FIG. 1, the Target RNC ID is formed by:

an LAI (location area identity), including two parts, a PLMN ID (Public Land Mobile Network Identity, public land mobile network identity) and an LAC (Location Area Code, location area code), which respectively occupy three bytes and two bytes;

an RAC (routing area code), which occupies one byte;

an RNC ID (radio network controller identity), which has a range of 0 to 4095 and occupies 12 bits; and an Extended RNC-ID, which has a range of 4096 to 60535 and occupies 13 to 16 bits.

In the prior art, when the Extended RNC-ID is carried, the RNC-ID is ignored.

Therefore, when the Target RNC ID does not include the Extended RNC-ID, the Target RNC ID occupies 60 bits. When the Target RNC ID includes the Extended RNC-ID, and the RNC-ID included in the Extended RNC-ID is not available, in this case, the number of bits occupied by the Target RNC ID depends on the number of bits of the Extended RNC-ID, and the number of bits has a range of 73 to 76, but the number of available bits is 61 to 64.

Figure 2:
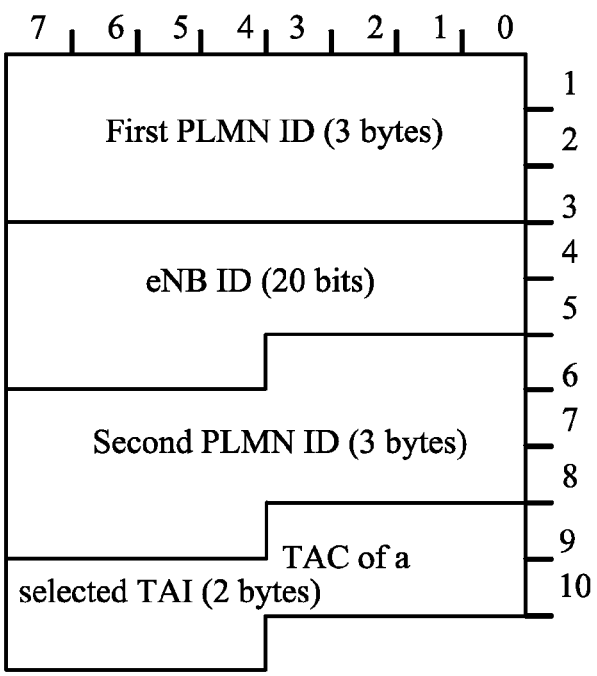
FIG. 2 is a schematic diagram of a Target eNB ID.

FIG. 2 is a schematic diagram of a Target eNB ID. As shown in FIG. 2, the Target eNB ID is formed by:

a PLMN ID, which is a PLMN identity used when an eNB registers with a core network, indicates that the eNB belongs to an operator of the PLMN, and occupies three bytes, where this PLMN ID is called a first PLMN ID for convenience of description;

an eNB ID, which may be classified into a Macro eNB ID (macro evolution base station identity) and Home eNB ID (home evolution base station identity), which occupy 20 bits and 28 bits respectively; and a Selected TAI (Tracking Area Identifier, selected tracking area identifier), including a PLMN ID and a TAC (Tracking Area Code, tracking area code), where the PLMN ID and the TAC are a PLMN identity and a tracking area code of a target serving network selected by an RNC, and, for convenience of description, the PLMN ID in the Selected TAI is called a second PLMN ID.

It should be noted that the Macro eNB ID is taken as an example of the eNB ID in FIG. 2.

Therefore, the number of bits occupied by the Target eNB ID is 84, different from a compositional element and a length of the Target RNC ID, and many SGSNs cannot identify the Target eNB ID. In this case, the Target eNB ID needs to be converted into a Corresponding RNC ID. A structure of the Corresponding RNC ID is same as that of the Target RNC ID shown in FIG. 1.

Figure 3:
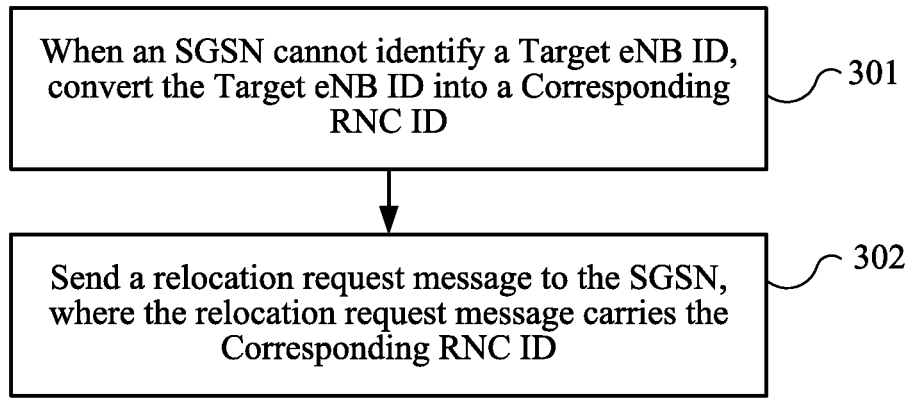
FIG. 3 is a flow chart of a method for a UMTS-to-LTE handover according to an embodiment of the present invention.

FIG. 3 is a flow chart of a method for a UMTS-to-LTE handover according to an embodiment of the present invention. The method in FIG. 3 is executed by an RNC which initiates a handover.

301. When an SGSN cannot identify a Target eNB ID, convert the Target eNB ID into a Corresponding RNC ID.

302. Send a relocation required message to the SGSN, where the relocation required message carries the Corresponding RNC ID.

Step 301 may further include: select one of a first PLMN ID and a second PLMN ID included in the Target eNB ID, and the first PLMN ID corresponds to first three bytes of the Target eNB ID, and the second PLMN ID is a PLMN ID in a Selected TAI included in the Target eNB ID; and fill, in the Corresponding RNC ID, the selected PLMN ID, an eNB ID included in the Target eNB ID, and a tracking area code TAC in the Selected TAI.

Therefore, in the embodiment of the present invention, when the Target eNB ID is converted, a PLMN ID in the Target eNB ID is discarded, so that bits to be converted can be admitted into the Corresponding RNC ID, and conversion between the Target eNB ID and the Corresponding RNC ID can be implemented.

Specifically, to perform conversion successfully, a part of bits needs to be discarded when the Target eNB ID is converted. The Target eNB ID includes two PLMN IDs. The first PLMN ID corresponds to first three bytes of the Target eNB ID, and the second PLMN ID is the PLMN ID in the Selected TAI. The two PLMN IDs may be same, and may also be different.

When the first PLMN ID and the second PLMN ID are same, the first PLMN ID or the second PLMN ID may be selected as the selected PLMN ID to be filled in the Corresponding RNC ID; when the first PLMN ID and the second PLMN ID are different, in order to accurately send a handover request to a core network device MME of the serving network, the second PLMN ID may be selected as the selected PLMN ID.

Figure 4:
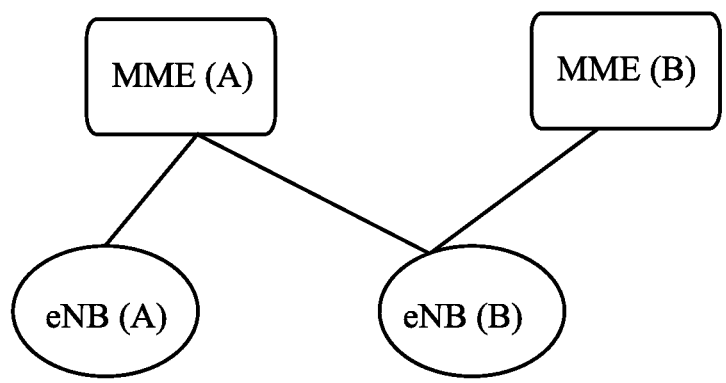
FIG. 4 is a schematic diagram of an exemplary network sharing scenario.

FIG. 4 is a schematic diagram of an exemplary network sharing scenario. As shown in FIG. 4, an MME (A) and an eNB (A) belong to a network operator A, and an MME (B) and an eNB (B) belong to a network operator B. The eNB (B) may be connected to the core network MME (A) of a network of the operator A, and be used by the network of the operator A. This kind of scenario is called network sharing. In a network sharing scenario, a UE registering with the network of the operator A may either access the core network MME (A) of the A network through the eNB (A) of the A network, or access the core network MME (A) of the A network through the eNB (B) of the B network.

When an RNC determines to migrate the UE to a certain cell under the eNB (A) to access the A network, in a Target eNB ID under this circumstance, both a first PLMN ID and a second PLMN ID are PLMN(A) IDs. When the RNC determines to migrate the UE to a certain cell under the eNB (B) to access the A network, in the Target eNB ID under this circumstance, the first PLMN ID is a PLMN(B) ID, and the second PLMN ID is a PLMN(A) ID. As for a target eNB like the eNB (A), that is, a target eNB which is not shared by another network, two PLMN IDs in the Target eNB-ID are same, and either of the PLMN IDs may be used for conversion to accurately send a handover request to a core network device MME of the serving network. However, as for the eNB (B), that is, a target eNB which is shared by another network, there may be two different PLMN IDs, in this case, in order to accurately send the handover request to the core network device MME of the serving network, the second PLMN ID needs to be selected for conversion and the first PLMN ID is discarded.

Figure 5:
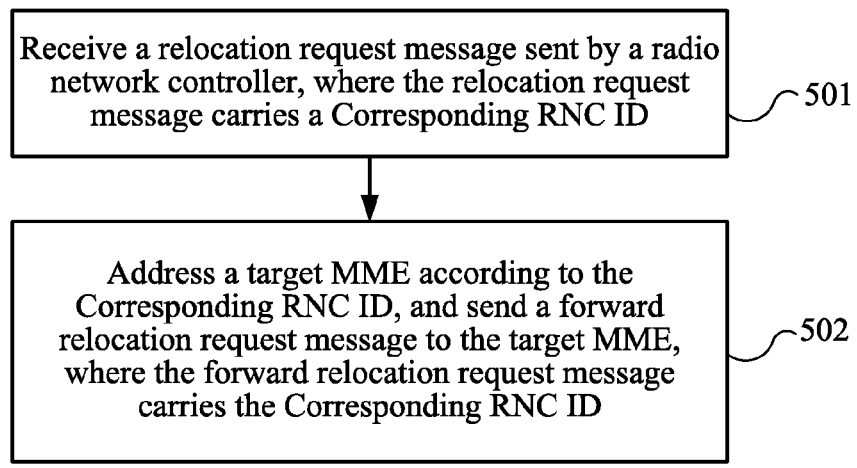
FIG. 5 is a flow chart of a method for a UMTS-to-LTE handover according to another embodiment of the present invention.

FIG. 5 is a flow chart of a method for a UMTS-to-LTE handover according to another embodiment of the present invention. Based on the implementation of the method in FIG. 3, the method in FIG. 5 is executed by an SGSN and corresponds to the method in FIG. 3, and therefore a detailed description may be properly omitted.

501: Receive a relocation request message sent by a radio network controller, where the relocation request message carries a Corresponding RNC ID, and the Corresponding RNC ID is obtained by converting a target long term evolution base station identity Target eNB ID, and carries a selected public land mobile network identity PLMN ID, a long term evolution base station identity eNB ID included in the Target eNB ID, and a tracking area code TAC in a selected tracking area identity Selected TAI included in the Target eNB ID, and the selected PLMN ID is one of a first PLMN ID and a second PLMN ID included in the Target eNB ID.

502: Address a target MME according to the Corresponding RNC ID, and send a forward relocation request (Forward Relocation Request) message to the addressed target MME, where a target identity Target ID in the forward relocation request message carries information of the Corresponding RNC ID.

Therefore, in the embodiment of the present invention, when the Target eNB ID is converted, a PLMN ID in the Target eNB ID is discarded, so that bits to be converted can be admitted into the Corresponding RNC ID, and conversion between the Target eNB ID and the Corresponding RNC ID can be implemented.

Meanwhile, the SGSN addresses a corresponding target MME according to the Corresponding RNC ID, and completes sending the forward relocation request message, which ensures smooth execution of a handover procedure.

For example, the first PLMN ID corresponds to first three bytes of the Target eNB ID, and the second PLMN ID is a PLMN ID in the Selected TAI. The two PLMN IDs may be same, and may also be different. When the first PLMN ID and the second PLMN ID are the same, the selected PLMN ID is the first PLMN ID or the second PLMN ID; when the first PLMN ID and the second PLMN ID are different, the selected PLMN ID may be the second PLMN ID in order to accurately send a handover request to a core network device MME of the serving network.

Figure 6:
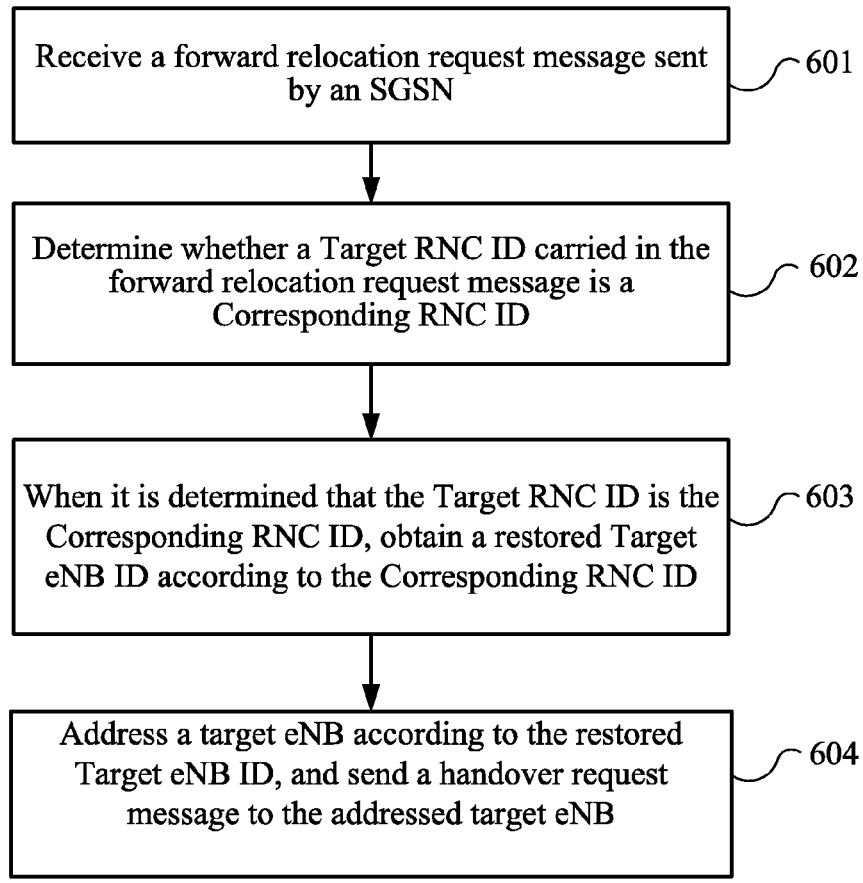
FIG. 6 is a flow chart of a method for a UMTS-to-LTE handover according to another embodiment of the present invention.

FIG. 6 is a flow chart of a method for a UMTS-to-LTE handover according to another embodiment of the present invention. The method in FIG. 6 is executed by an MME and corresponds to the methods in FIG. 4 and FIG. 5, and therefore a detailed description may be properly omitted.

601: Receive a forward relocation request message sent by a serving general packet radio service support node SGSN.

602: Determine whether a Target ID in the forward relocation request message is a corresponding radio network controller identity Corresponding RNC ID, where the Corresponding RNC ID is obtained by converting a first target long term evolution base station identity Target eNB ID, and carries a selected public land mobile network identity PLMN ID, a long term evolution base station identity eNB ID included in the Target eNB ID, and a tracking area code TAC in a selected tracking area identity Selected TAI included in the Target eNB ID, and the selected PLMN ID is one of a first PLMN ID and a second PLMN ID included in the Target eNB ID.

603: When it is determined that the Target ID is the Corresponding RNC ID, obtain a restored Target eNB ID according to the Corresponding RNC ID.

604: Address a target eNB according to the restored Target eNB ID, and send a handover request message to the addressed target eNB.

Therefore, in the embodiment of the present invention, when the Target eNB ID is converted, a PLMN ID in the Target eNB ID is discarded, so that bits to be converted can be admitted into the Corresponding RNC ID, and conversion between the Target eNB ID and the Corresponding RNC ID can be implemented.

Meanwhile, the MME can identify the Corresponding RNC ID, restore elements of the Target eNB ID from the Corresponding RNC ID, address a corresponding target eNB according to the Corresponding RNC ID, and complete sending the handover request message, which ensures smooth execution of a handover procedure.

For example, the first PLMN ID corresponds to first three bytes of the Target eNB ID, and the second PLMN ID is a PLMN ID in the Selected TAI. The two PLMN IDs may be same, and may also be different. When the first PLMN ID and the second PLMN ID are the same, the selected PLMN ID is the first PLMN ID or the second PLMN ID; when the first PLMN ID and the second PLMN ID are different, the selected PLMN ID may be the second PLMN ID in order to accurately send a handover request to a core network device MME of the serving network.

In 603, elements of the restored Target eNB ID, such as a PLMN ID, an eNB ID and a TAC, are obtained according to an inverse process for filling elements in 301 of FIG. 3. Optionally, in one embodiment, two PLMN IDs in the restored Target eNB ID are both the selected PLMN ID carried in the Corresponding RNC ID.

Optionally, as another embodiment, in step 602, it is determined, according to a bit corresponding to the TAC, or a bit corresponding to the eNB ID and/or added one to four bits in the Target RNC ID, whether the Target RNC ID is the Corresponding RNC ID. For example, according to a rule for filling elements in 301 of FIG. 3, when the eNB ID or the TAC is planned, its value should be distinguished from a value of an element (such as a PLMN ID, an LAC, an RAC, an RNC-ID or an extended RNC-ID) represented by a corresponding bit in the Target RNC ID, so as to enable the MME to distinguish whether the Target RNC ID is the Corresponding RNC ID or a real RNC ID. In addition, under a circumstance of adding a bit, the Corresponding RNC ID and the Target RNC ID may be further distinguished according to a specific value of an added bit. Or, the Corresponding RNC ID and the Target RNC ID may be distinguished according to a combination of the eNB ID and the added bit. These variations fall into the scope of the embodiment of the present invention.

With reference to a specific example, the following describes the embodiment of the present invention in more details. It should be noted that, under a circumstance without special instructions, the following Target eNB ID refers to a situation that the target eNB is a Macro eNB.

In addition, the following mainly describes a process for converting the Target eNB ID into the Corresponding RNC ID. A process for restoring the Corresponding RNC ID to the Target eNB ID is an inverse process of the converting process, which therefore is not described repeatedly.

Figure 7:
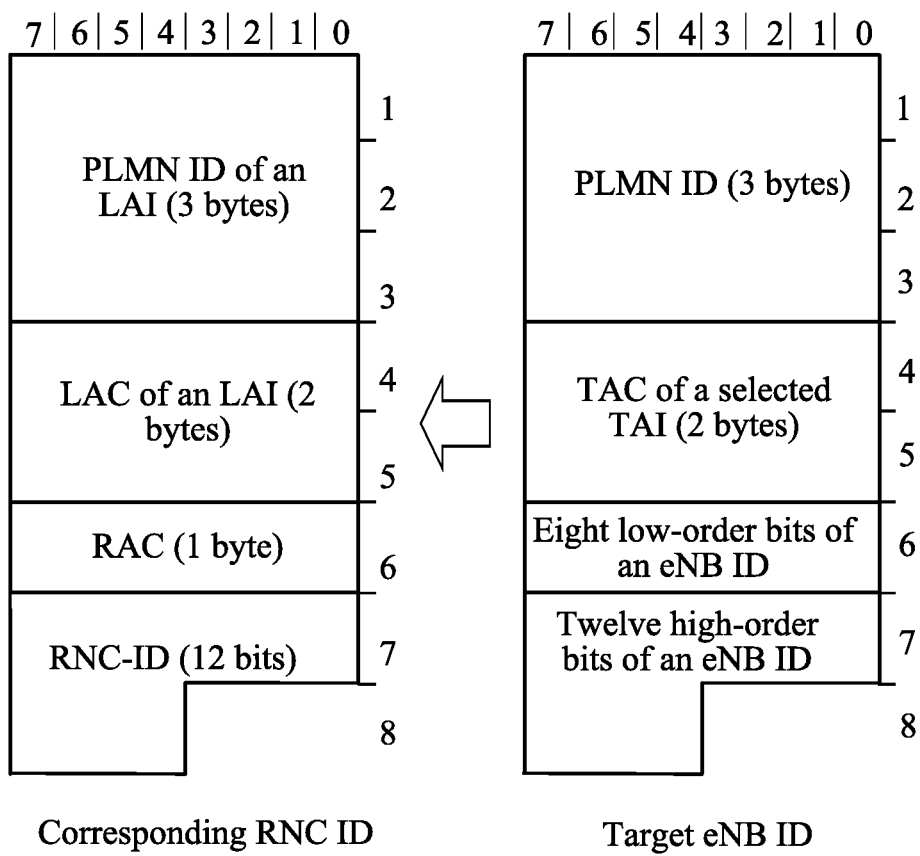
FIG. 7 is a schematic diagram of an example of identity conversion according to an embodiment of the present invention.

FIG. 7 is a schematic diagram of an example of identity conversion according to an embodiment of the present invention. As shown in FIG. 7, a corresponding data element of a converted Corresponding RNC ID is on a left side, and a corresponding data element of an actual Target eNB ID is on a right side.

When an RNC initiates a UMTS-LTE inter-system handover, it may be first determined whether an SGSN identifies a Target eNB ID. For example, a preset information element in Iu interface mutual information may be used for indication, such as a RAB ASSIGNMENT REQUEST (RAB assignment request) or a COMMON ID (common identity) message, to which it is not limited. Or, the RNC may make a determination through SGSN information configured in a background. If the SGSN cannot identify the Target eNB ID, conversion processing in step 301 may be executed according to the following rules.

A selected PLMN ID is filled in as a PLMN ID in a location area identity LAI in a Corresponding RNC ID, that is, first three bytes in the Corresponding RNC ID.

A TAC in a Selected TAI is filled in as an LAC in the LAI of the Corresponding RNC ID, that is, two bytes behind a PLMN in the Corresponding RNC ID.

Eight bits in an eNB ID (such as, 20 bits) are filled in as an RAC in the Corresponding RNC ID, that is, a byte behind the LAC in the Corresponding RNC ID. In the embodiment of FIG. 7, the eight bits are eight low-order bits in the eNB ID.

Twelve bits except the eight bits in the eNB ID are filled in as an RNC-ID in the Corresponding RNC ID, that is, twelve bits behind the RAC in the Corresponding RNC ID. In the embodiment of FIG. 7, the twelve bits are twelve high-order bits in the eNB ID.

When the eNB ID is planned, a value of the twelve high-order bits in the eNB ID needs to be distinguished from an RNC ID in an existing network, and is used for an MME to distinguish whether a Target RNC-ID is a real RNC-ID or the Corresponding RNC-ID. Or, when the TAC is planned, the TAC needs to be distinguished from an LAC in the existing network, and is used for the MME to distinguish whether a Target RNC-ID is a real RNC-ID or the Corresponding RNC-ID.

After receiving a Relocation Required message, the SGSN queries an IP address of a target MME according to a Target ID identity (that is, the foregoing Corresponding RNC-ID) in the Relocation Required message, and forwards information of the Corresponding RNC-ID to the target MME through a Forward Relocation Request message. When querying the IP address of the target MME, the SGSN may perform addressing in the following two manners: an rnc<RNC>.mnc<MNC>.mcc<MCC>.gprs domain name or an rac<RAC>.lac<LAC>.mnc<MNC>.mcc<MCC>.gprs domain name. The RNC herein may be the RNC-ID or an Extended RNC-ID. Because of specific planning when the TAC or the eNB ID is planned, the twelve high-order bits of the eNB ID may be distinguished from an RNC ID in the existing network, or the TAC may be distinguished from an LAC in the existing network. Therefore, when the SGSN addresses the MME IP in one of the two manners, there is no conflict with querying of an SGSN IP address according to this manner.

After receiving the Forward Relocation Request message, the MME determines whether the Target ID is the real RNC-ID or the Corresponding RNC ID. If the Target ID is the Corresponding RNC ID, the Target ID is inversely restored to obtain elements of the Target eNB ID according to the foregoing conversion rule.

For example, the MME extracts a PLMN ID in a location area identity LAI of the Corresponding RNC ID to obtain a first PLMN ID or a second PLMN ID of the Target eNB ID; extracts a location area code LAC in the LAI of the Corresponding RNC ID to obtain the TAC in the Selected TAI of the Target eNB ID; extracts a routing area code RAC in the Corresponding RNC ID to obtain the eight bits in the eNB ID of the Target eNB ID; and extracts the RNC-ID in the Corresponding RNC ID to obtain the twelve bits except the eight bits in the eNB ID of the Target eNB ID. In the embodiment of FIG. 7, the eight bits are the eight low-order bits of the eNB ID, and the twelve bits are the twelve high-order bits of the eNB ID, which are combined to obtain an eNB ID of twenty bits.

The MME addresses the target eNB by using the elements of the restored Target eNB ID, and sends a Handover Request message to the target eNB.

In this way, in the embodiment of the present invention, the Target eNB ID can be converted into the Corresponding RNC ID, the SGSN can correctly address the target MME, and the target MME can correctly address the target eNB, which ensures smooth execution of a handover request procedure.

Figure 8:
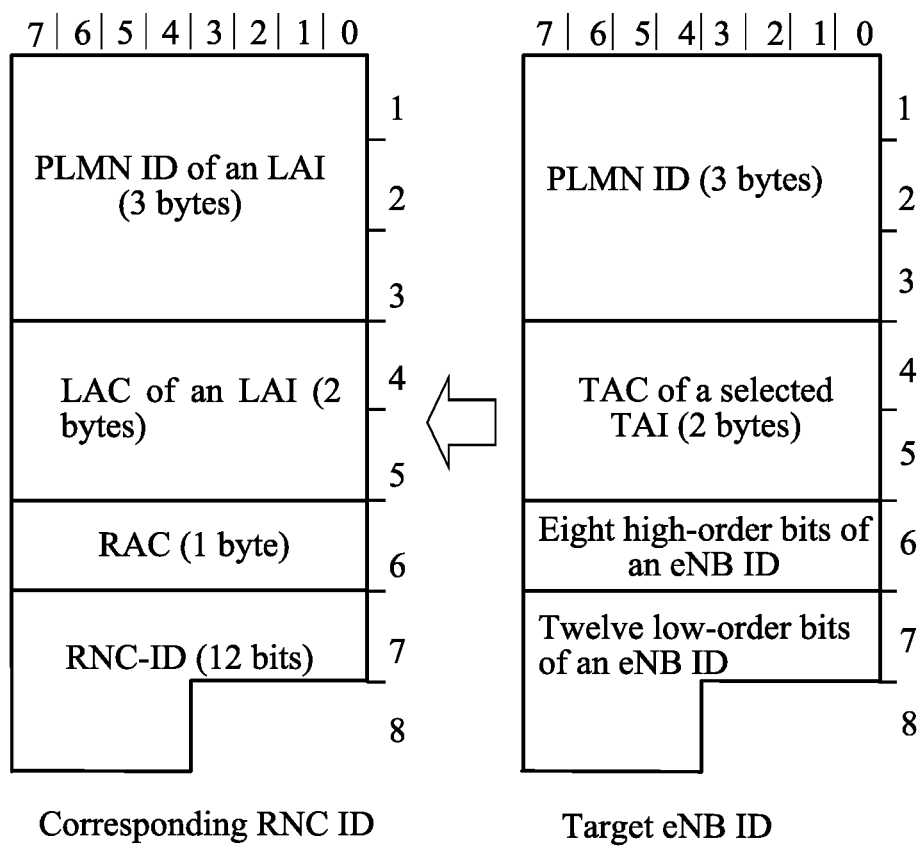
FIG. 8 is a schematic diagram of an example of identity conversion according to another embodiment of the present invention.

FIG. 8 is a schematic diagram of an example of identity conversion according to an embodiment of the present invention. As shown in FIG. 8, a corresponding data element of a converted Corresponding RNC ID is on a left side, and a corresponding data element of an actual Target eNB ID is on a right side.

A difference between the embodiment of FIG. 8 and the embodiment of FIG. 7 lies in that, eight high-order bits of an eNB ID are filled in as an RAC, and twelve low-order bits of the eNB ID are filled in as an RNC-ID, to which it is not limited in the embodiment of the present invention. Actually, any eight bits of the eNB ID may be filled in as the RAC, and the remaining twelve bits are filled in as the RNC-ID.

In the embodiment of FIG. 8, when the eNB ID is planned, a value of the twelve low-order bits of the eNB ID needs to be distinguished from an RNC ID in an existing network, is used for an MME to distinguish whether a Target RNC-ID is a real RNC-ID or a Corresponding RNC ID. Or, when a TAC is planned, the TAC needs to be distinguished from an LAC in an existing network, and is used for an MME to distinguish whether a Target RNC ID is a real RNC-ID or a Corresponding RNC ID.

A method for an SGSN to address a target MME address, a method for the MME to restore a Target eNB ID, and a method for the MME to seek a target eNB are similar to the embodiment of FIG. 7, and are implemented according to an inverse process of the foregoing filling rule, and therefore, details are not repeatedly described herein. For example, the MME extracts a PLMN ID in a location area identity LAI of the Corresponding RNC ID to obtain a first PLMN ID or a second PLMN ID of the Target eNB ID; extracts a location area code LAC in the LAI of the Corresponding RNC ID to obtain a TAC in a Selected TAI of the Target eNB ID; extracts a routing area code RAC in the Corresponding RNC ID to obtain eight bits in an eNB ID of the Target eNB ID; and extracts an RNC-ID in the Corresponding RNC ID to obtain twelve bits except the eight bits in the eNB ID of the Target eNB ID. In the embodiment of FIG. 8, the eight bits are eight high-order bits of the eNB ID, and the twelve bits are twelve low-order bits of the eNB ID, which are combined to obtain an eNB ID of twenty bits.

In this way, in the embodiment of the present invention, the Target eNB ID can be converted into the Corresponding RNC ID, the SGSN can correctly address the target MME, and the target MME can correctly address the target eNB, which ensures smooth execution of a handover request procedure.

Figure 9:
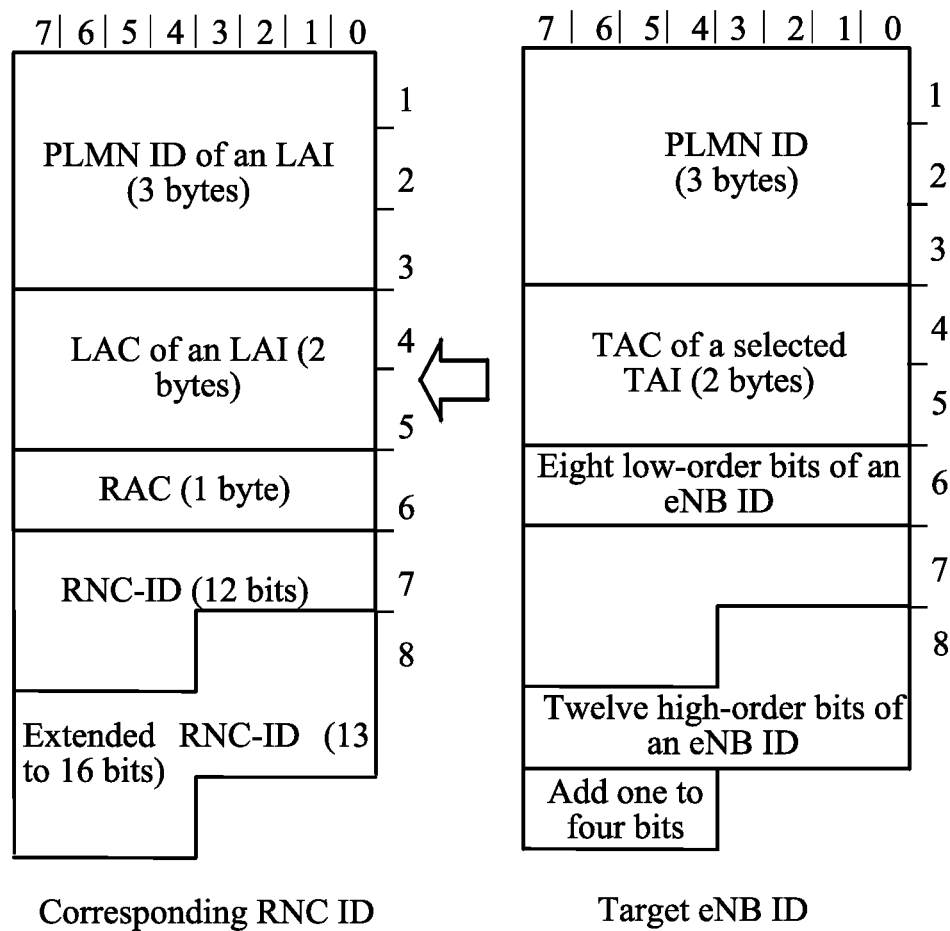
FIG. 9 is a schematic diagram of an example of identity conversion according to another embodiment of the present invention.

FIG. 9 is a schematic diagram of an example of identity conversion according to an embodiment of the present invention. As shown in FIG. 9, a corresponding data element of a converted Corresponding RNC ID is on a left side, and a corresponding data element of an actual Target eNB ID is on a right side.

A difference between the embodiment of FIG. 9 and the embodiment of FIG. 7 lies in that an extended RNC-ID is used. Specifically, one to four bits are added in an eNB ID except twelve high-order bits and are filled in as the extended RNC-ID in a Corresponding RNC ID.

At the time of conversion, one to four bits need to be added, and the number of added bits (1 to 4) is determined according to the length of the extended RNC-ID. The several bits may be set as specific values, so as to be distinguished from an Extended RNC-ID in an existing network. Or, when the eNB ID is planned, the eNB ID or a combination of the eNB ID and the added bits is distinguished from the Extended RNC-ID in an existing network. Or, when a TAC is planned, the TAC needs to be distinguished from an LAC in an existing network, and is used for an MME to distinguish whether a Target RNC ID is a real RNC ID or a Corresponding RNC ID.

In addition, in the example in FIG. 9, the one to four bits are added behind twelve bits of the eNB ID, to which it is not limited in the embodiment of the present invention. The one to four bits may also be added in front of the twelve bits, or the one to four bits may be added intensively or dispersedly in any location in front of, behind or among the twelve bits.

After receiving a Relocation Required message, an SGSN queries an IP address of a target MME according to a Target ID identity in the message, and forwards a handover request to the target MME through a Forward Relocation Request. When querying the IP address of the MME, the SGSN performs addressing through an rnc<RNC>.mnc<MNC>.mcc<MCC>.gprs domain name or an rac<RAC>.lac<LAC>.mnc<MNC>.mcc<MCC>.gprs domain name, and the RNC herein may be an RNC-ID or an Extended RNC-ID. Because several bits of which values are specific values are also converted into an Extended RNC ID, the converted Extended RNC ID may be distinguished from an Extend RNC ID in the existing network; or because it is distinguished from an LAC or an Extended RNC-ID in the existing network when a TAC or an eNB ID is planned, the SGSN may address the MME IP in one of the two manners, which may not conflict with querying of an SGSN IP address in this manner.

A method for the SGSN to address a target MME address, a method for the MME to restore a Target eNB ID and a method for the MME to seek a target eNB are similar to the embodiment of FIG. 7, and are implemented according to an inverse process of the foregoing filling rule, and therefore, details are not repeatedly described herein. For example, the MME extracts a PLMN ID in a location area identity LAI of the Corresponding RNC ID to obtain a first PLMN ID or a second PLMN ID of the Target eNB ID; extracts a location area code LAC in the LAI of the Corresponding RNC ID to obtain a TAC in a Selected TAI of the Target eNB ID; extracts a routing area code RAC in the Corresponding RNC ID to obtain eight bits in the eNB ID of the Target eNB ID; and extracts an extended RNC-ID in the Corresponding RNC ID to obtain twelve bits except the eight bits in the eNB ID of the Target eNB ID (in this case, one to four bits added in an RNC need to be subtracted). In the embodiment of FIG. 9, the eight bits are eight low-order bits of the eNB ID, and the twelve bits are twelve high-order bits of the eNB ID, which are combined to obtain an eNB ID of twenty bits.

In this way, in the embodiment of the present invention, the Target eNB ID may be converted into the Corresponding RNC-ID, the SGSN may correctly address the target MME, and the target MME may correctly address an eNB, which ensures smooth execution of a handover request procedure.

Figure 10:
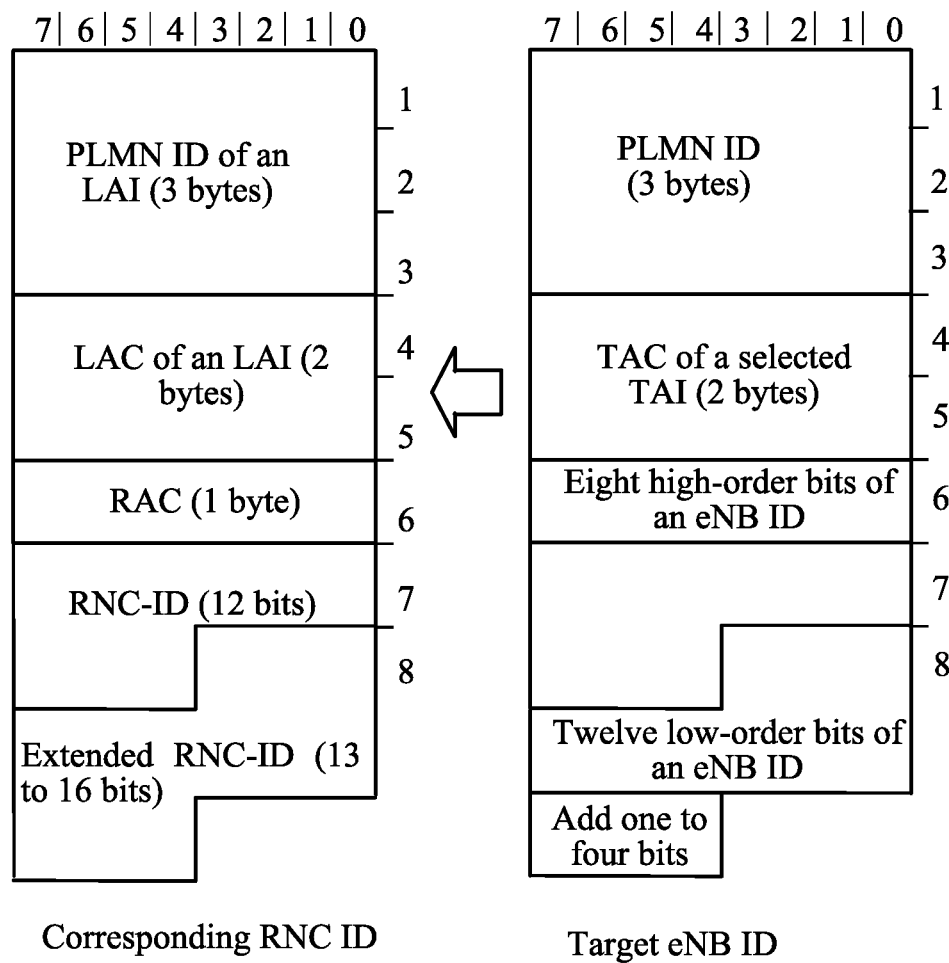
FIG. 10 is a schematic diagram of an example of identity conversion according to another embodiment of the present invention.

FIG. 10 is a schematic diagram of an example of identity conversion according to an embodiment of the present invention. As shown in FIG. 10, a corresponding data element of a converted Corresponding RNC-ID is on a left side, and a corresponding data element of an actual Target eNB ID is on a right side.

A difference between the embodiment of FIG. 10 and the embodiment of FIG. 9 lies in that, eight high-order bits of an eNB ID are filled in as an RAC, and twelve low-order bits of the eNB ID are added with one to four bits and filled in as an extended RNC-ID, to which it is not limited in the embodiment of the present invention. Actually, any eight bits of the eNB ID may be filled in as the RAC, and the remaining twelve bits are added with one to four bits and then filled in as the extended RNC-ID.

At the time of conversion, one to four bits need to be added, and the several bits may be set as specific values, so as to be distinguished from an Extended RNC-ID in an existing network. Or, when the eNB ID is planned, the eNB ID or a combination of the eNB ID and added bits is distinguished from an Extended RNC-ID in an existing network. Or, when a TAC is planned, the TAC needs to be distinguished from an LAC in an existing network, and is used for an MME to distinguish whether a Target RNC ID is a real RNC ID or a Corresponding RNC ID.

A method for an SGSN to address a target MME address, a method for the MME to restore a Target eNB ID and a method for the MME to seek a target eNB are similar to the embodiment of FIG. 7, and are implemented according to an inverse process of the foregoing filling rule, and therefore, details are not repeatedly described herein. For example, the MME extracts a PLMN ID in a location area identity LAI of the Corresponding RNC ID to obtain a first PLMN ID or a second PLMN ID of the Target eNB ID; extracts a location area code LAC in the LAI of the Corresponding RNC ID to obtain a TAC in a Selected TAI of the Target eNB ID; extracts a routing area code RAC in the Corresponding RNC ID to obtain eight bits in the eNB ID of the Target eNB ID; and extracts the extended RNC-ID in the Corresponding RNC ID to obtain twelve bits except the eight bits in the eNB ID of the Target eNB ID (in this case, the one to four bits added in an RNC need to be subtracted). In the embodiment of FIG. 9, the eight bits are eight high-order bits of the eNB ID, and the twelve bits are twelve low-order bits of the eNB ID, which are combined to obtain an eNB ID of twenty bits.

Figure 11:
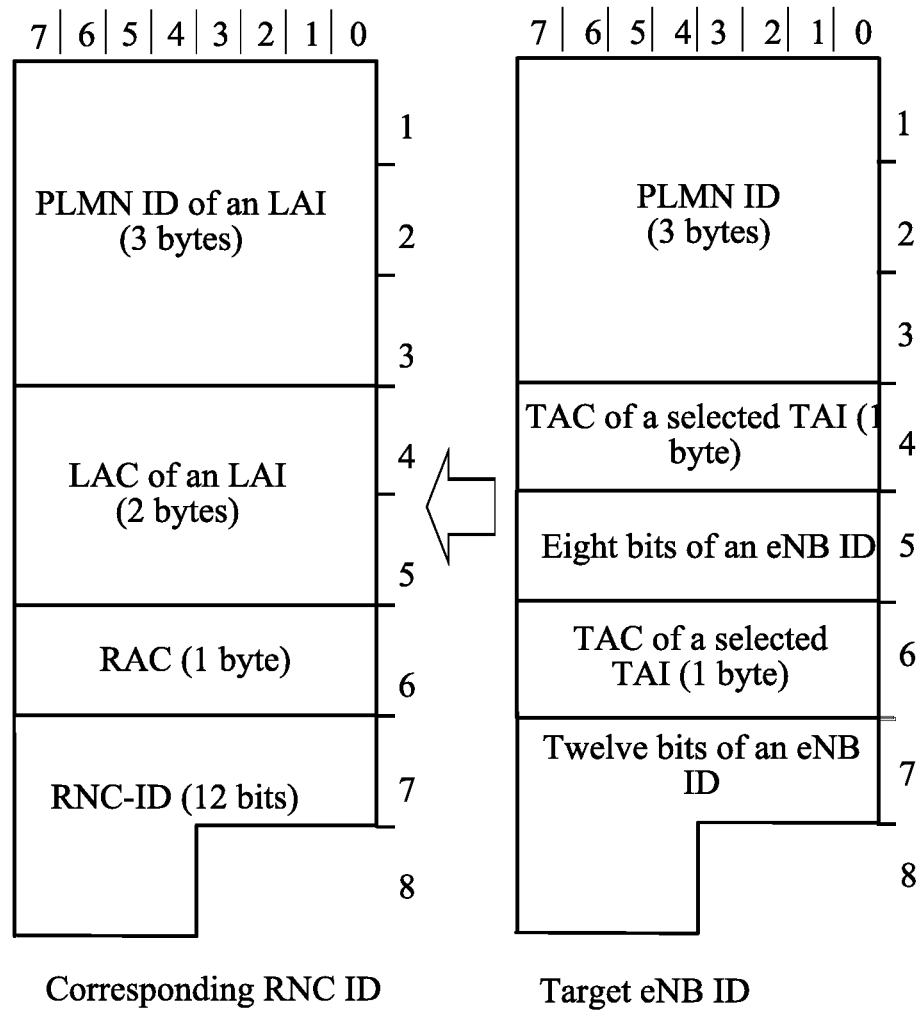
FIG. 11 is a schematic diagram of an example of identity conversion according to another embodiment of the present invention.

FIG. 11 is a schematic diagram of an example of identity conversion according to an embodiment of the present invention. As shown in FIG. 11, a corresponding data element of a converted Corresponding RNC ID is on a left side, and a corresponding data element of an actual Target eNB ID is on a right side.

A difference between the embodiment of FIG. 11 and the embodiments of FIG. 7 and FIG. 8 lies in that, eight bits (eight high-order bits, eight low-order bits or any other eight bits) of an eNB ID in FIG. 11 are filled in as a second byte of an LAC, and a TAC in a Selected TAI is filled in as a first byte of the LAC and an RAC.

Specifically, when an RNC initiates a UMTS-LTE intersystem handover, it may be first determined whether an SGSN identifies a Target eNB ID. For example, a preset information element in Iu interface mutual information may be used for indication, such as a RAB ASSIGNMENT REQUEST or a COMMON ID message, to which it is not limited. Or, the RNC may determine through SGSN information configured in a background.

If the SGSN cannot identify the Target eNB ID, conversion processing in step 301 may be executed according to the following rules:

the selected PLMN ID is filled in as a PLMN ID in an LAI of the Corresponding RNC ID;

the TAC in the Selected TAI is filled in as the first byte of the LAC in the LAI of the Corresponding RNC ID, and the RAC;

the eight bits in the eNB ID are filled in as the second byte of the LAC in the LAI of the Corresponding RNC ID; and the twelve bits except the eight bits in the eNB ID are filled in as an RNC-ID in the Corresponding RNC ID.

When the eNB ID is planned, the twelve bits of the eNB ID that are mapped to the RNC-ID need to be distinguished from an RNC-ID in an existing network, or when the TAC is planned, the TAC needs to be distinguished from an RAC or an LAC in an existing network, and is used for an MME to distinguish whether a Target RNC ID is a real RNC ID or the Corresponding RNC ID.

A method for the SGSN to address a target MME address, a method for the MME to restore the Target eNB ID and a method for the MME to seek a target eNB are similar to the embodiment of FIG. 7, and are implemented according to an inverse process of the foregoing filling rule, and therefore, details are not repeatedly described herein. For example, the MME extracts the PLMN ID in the LAI of the Corresponding RNC ID to obtain a first PLMN ID or a second PLMN ID of the Target eNB ID; extracts one byte of the LAC in the LAI of the Corresponding RNC ID and the RAC to obtain the TAC in the Selected TAI of the Target eNB ID; extracts another byte of the LAC in the LAI of the Corresponding RNC ID to obtain the eight bits in the eNB ID of the Target eNB ID; and extracts the RNC-ID in the Corresponding RNC ID to obtain the twelve bits except the eight bits in the eNB ID of the Target eNB ID. In the embodiment of FIG. 9, the eight bits are any eight bits of the eNB ID, and the twelve bits are the remaining twelve bits of the eNB ID, which are combined to obtain an eNB ID of twenty bits. The one byte of the LAC is the first byte.

Figure 12:
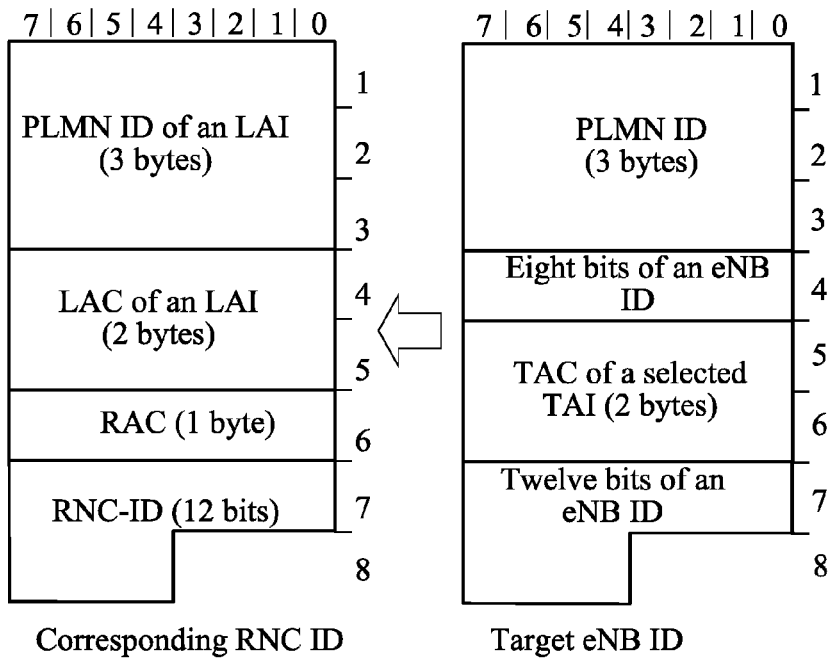
FIG. 12 is a schematic diagram of an example of identity conversion according to another embodiment of the present invention.

FIG. 12 is a schematic diagram of an example of identity conversion according to an embodiment of the present invention. As shown in FIG. 12, a corresponding data element of a converted Corresponding RNC ID is on a left side, and a corresponding data element of an actual Target eNB ID is on a right side.

A difference between the embodiment of FIG. 12 and the embodiment of FIG. 11 lies in that, a location of eight bits (eight high-order bits, eight low-order bits or any other eight bits) of an eNB ID in FIG. 12 is further moved forward by one byte and the eight bits are filled in a first byte of an LAC, and a TAC in a Selected TAI is filled in as a second byte of the LAC and an RAC.

Specifically, when an RNC initiates a UMTS-LTE intersystem handover, it may be first determined whether an SGSN identifies a Target eNB ID. For example, a preset information element in Iu interface mutual information may be used for indication, such as a RAB ASSIGNMENT REQUEST or a COMMON ID message, to which it is not limited. Or, the RNC may determine through SGSN information configured in a background.

If the SGSN cannot identify the Target eNB ID, conversion processing in step 301 may be executed according to the following rules:

the selected PLMN ID is filled in as a PLMN ID in an LAI of a Corresponding RNC ID;

the TAC in the Selected TAI is filled in as the second byte of the LAC in the LAI of the Corresponding RNC ID and the RAC;

the eight bits in the eNB ID are filled in as the first byte of the LAC in the LAI of the Corresponding RNC ID; and twelve bits except the eight bits in the eNB ID are filled in as an RNC-ID in the Corresponding RNC ID.

When the eNB ID is planned, the twelve bits of the eNB ID that are mapped to the RNC-ID need to be distinguished from an RNC-ID in an existing network, or when the TAC is planned, the TAC needs to be distinguished from an RAC or an LAC in an existing network, and is used for an MME to distinguish whether a Target RNC ID is a real RNC ID or the Corresponding RNC ID.

A method for the SGSN to address a target MME address, a method for the MME to restore the Target eNB ID and a method for the MME to seek a target eNB are similar to the embodiment of FIG. 7, and are implemented according to an inverse process of the foregoing filling rule, and therefore, details are not repeatedly described herein. For example, the MME extracts the PLMN ID in the LAI of the Corresponding RNC ID to obtain a first PLMN ID or a second PLMN ID of the Target eNB ID; extracts one byte of the LAC in the LAI of the Corresponding RNC ID and the RAC to obtain the TAC in the Selected TAI of the Target eNB ID; extracts another byte of the LAC in the LAI of the Corresponding RNC ID to obtain the eight bits in the eNB ID of the Target eNB ID; and extracts the RNC-ID in the Corresponding RNC ID to obtain the twelve bits except the eight bits in the eNB ID of the Target eNB ID. In the embodiment of FIG. 9, the eight bits are any eight bits of the eNB ID, and the twelve bits are the remaining twelve bits of the eNB ID, which are combined to obtain an eNB ID of twenty bits. The one byte of the LAC is the second byte.

Figure 13:
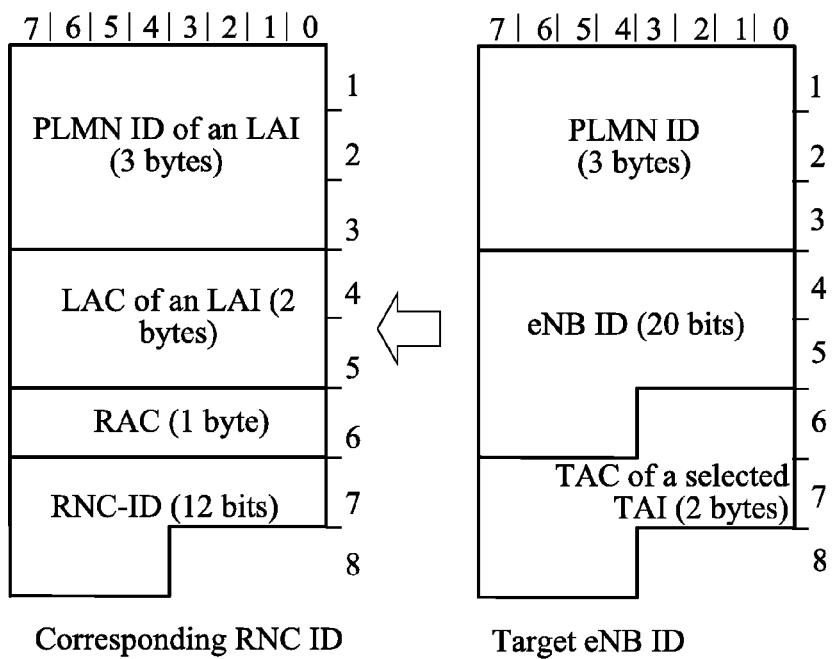
FIG. 13 is a schematic diagram of an example of identity conversion according to another embodiment of the present invention.

FIG. 13 is a schematic diagram of an example of identity conversion according to an embodiment of the present invention. As shown in FIG. 13, a corresponding data element of a converted Corresponding RNC ID is on a left side, and a corresponding data element of an actual Target eNB ID is on a right side.

In the embodiment of FIG. 13, a selected PLMN ID, an eNB ID and a TAC are filled in the Corresponding RNC ID in order. In the embodiment of the present invention, an order for filling the three elements is not limited. For example, in the embodiment of FIG. 7, the filling order is the PLMN ID, the TAC and the eNB ID. In the embodiment of FIG. 13, the filling order is the PLMN ID, the eNB ID and the TAC.

When the eNB ID is planned, the eNB ID needs to be distinguished from an LAC or an RAC in an existing network, or when the TAC is planned, the TAC needs to be distinguished from an RNC-ID or the RAC in an existing network, and is used for an MME to distinguish whether a Target RNC ID is a real RNC ID or the Corresponding RNC ID.

A method for an SGSN to address a target MME address, a method for the MME to restore a Target eNB ID and a method for the MME to seek a target eNB are similar to the embodiment of FIG. 7, and are implemented according to an inverse process of the foregoing filling rule, and therefore, details are not repeatedly described herein. For example, the MME obtains, by extracting, the first PLMN ID or the second PLMN ID, the eNB ID, and the TAC in order. Here, an order for the MME to extract elements may be changed according to a filling order.

Figure 14:
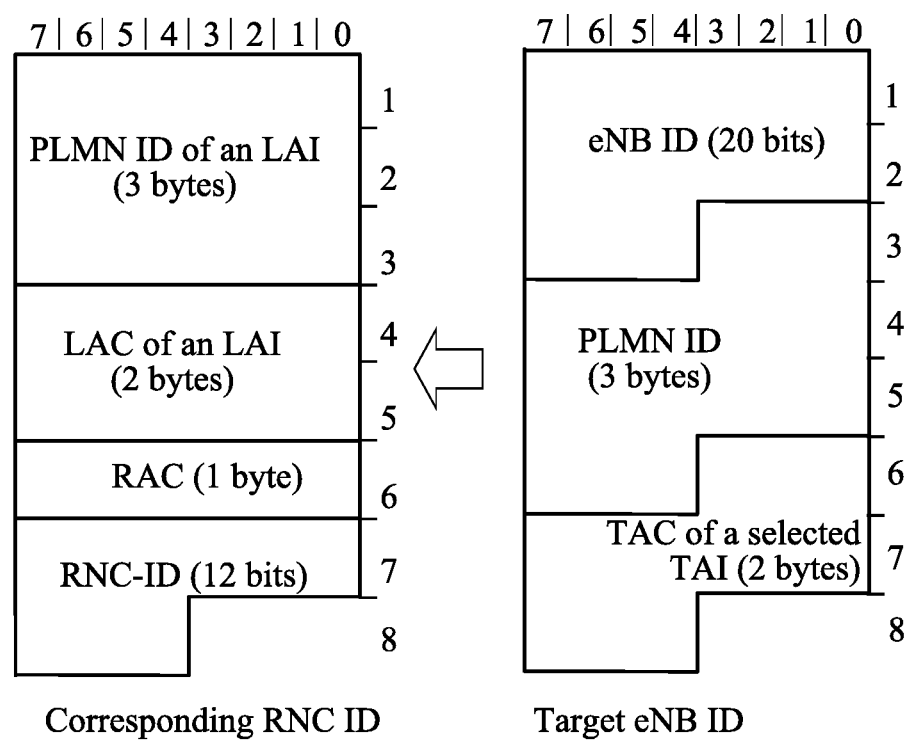
FIG. 14 is a schematic diagram of an example of identity conversion according to another embodiment of the present invention.

FIG. 14 is a schematic diagram of an example of identity conversion according to an embodiment of the present invention. As shown in FIG. 14, a corresponding data element of a converted Corresponding RNC ID is on a left side, and a corresponding data element of an actual Target eNB ID is on a right side.

A difference between the embodiment of FIG. 14 and the embodiment of FIG. 13 lies in that, an order for filling elements is an eNB ID, a PLMN ID and a TAC.

When the TAC is planned, the TAC needs to be distinguished from an RNC-ID or an RAC in an existing network.

A method for an SGSN to address a target MME address, a method for an MME to restore a Target eNB ID and a method for the MME to seek a target eNB are similar to the embodiment of FIG. 7, and are implemented according to an inverse process of the foregoing filling rule, and therefore, details are not repeatedly described herein. For example, the MME obtains, by extracting, the first PLMN ID or the second PLMN ID, the eNB ID, and the TAC in order. Here, an order for the MME to extract elements may be changed according to a filling order.

It should be noted that, in the embodiments of the foregoing FIG. 11 to FIG. 14, filling may be performed by using an extended RNC-ID, which may also be similar to the embodiments of FIG. 9 and FIG. 10. If a bit needs to be added when filling is performed, the added bit may be filled in any location in front of, behind or among a corresponding element. These variations fall into the scope of the embodiment of the present invention.

Figure 15:
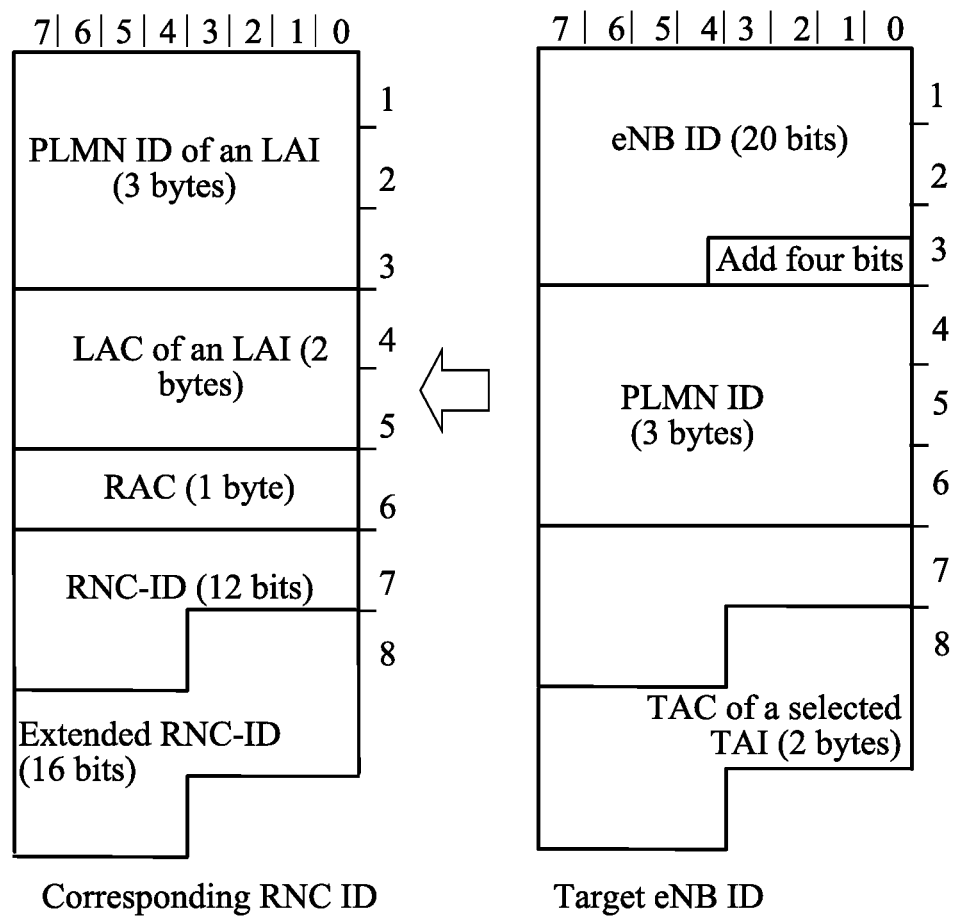
FIG. 15 is a schematic diagram of an example of identity conversion according to another embodiment of the present invention.

FIG. 15 is a schematic diagram of an example of identity conversion according to an embodiment of the present invention. As shown in FIG. 15, a corresponding data element of a converted Corresponding RNC ID is on a left side, and a corresponding data element of an actual Target eNB ID is on a right side.

In the embodiment of FIG. 15, an extended RNC-ID having the length of two bytes (16 bits) is used. If an SGSN cannot identify a Target eNB ID, conversion processing in step 301 may be executed according to the following rules:

an eNB ID is added with four bits and filled in as a PLMN ID in an LAI of a Corresponding RNC ID;

a selected PLMN ID is filled in as an LAC in the LAI of the Corresponding RNC ID and an RAC; and a TAC in a Selected TAI is filled in as an extended RNC-ID in the Corresponding RNC ID.

FIG. 15 shows the example for adding four bits behind the eNB ID, to which it is not limited in the embodiment of the present invention. The four bits may also be added in front of the eNB ID, or the four bits are added intensively or dispersedly in any other locations of the eNB ID.

When the TAC is planned, the TAC needs to be distinguished from an Extended RNC-ID in an existing network.

A method for the SGSN to address a target MME address, a method for an MME to restore the Target eNB ID and a method for the MME to seek a target eNB are similar to the embodiment of FIG. 7, and are implemented according to an inverse process of the foregoing filling rule, and therefore, details are not repeatedly described herein. For example, the MME extracts the PLMN ID in the LAI of the Corresponding RNC ID to obtain the eNB ID of the Target eNB ID; extracts the LAC in the LAI of the Corresponding RNC ID and the RAC to obtain the Target eNB ID; and extracts the extended RNC-ID in the Corresponding RNC ID to obtain the TAC in the Selected TAI of the Target eNB ID.

Figure 16:
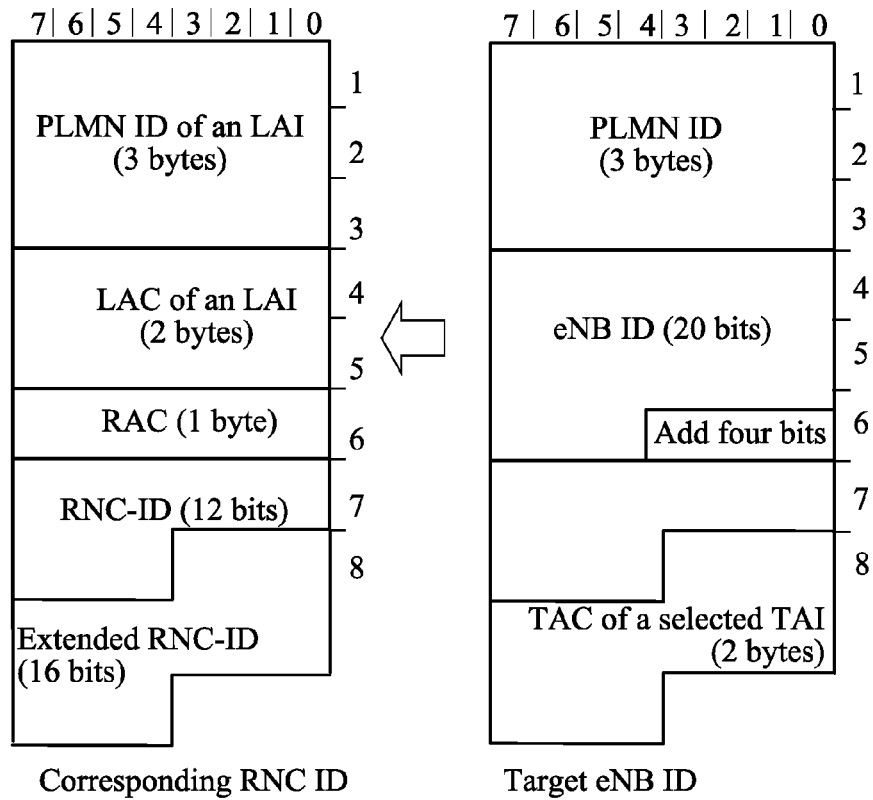
FIG. 16 is a schematic diagram of an example of identity conversion according to another embodiment of the present invention.

FIG. 16 is a schematic diagram of an example of identity conversion according to an embodiment of the present invention. As shown in FIG. 16, a corresponding data element of a converted Corresponding RNC ID is on a left side, and a corresponding data element of an actual Target eNB ID is on a right side.

A difference between FIG. 16 and FIG. 15 lies in that, an order for filling an eNB ID and an order for filling a PLMN ID are exchanged. Specifically, if an SGSN cannot identify a Target eNB ID, conversion processing in step 301 may be executed according to the following rules:

a selected PLMN ID is filled in as a PLMN ID in an LAI of a Corresponding RNC ID;

an eNB ID is added with four bits and filled in as an LAC in the LAI of the Corresponding RNC ID and an RAC; and a TAC in a Selected TAI is filled in as an extended RNC-ID in the Corresponding RNC ID.

FIG. 16 shows the example for adding four bits behind the eNB ID, to which it is not limited in the embodiment of the present invention. The four bits may also be added in front of the eNB ID, or the four bits are added intensively or dispersedly in any other locations of the eNB ID.

The added four bits are set as specific values, which may distinguish a converted LAC and RAC from an LAC and an RAC in an existing network. Or, when the TAC is planned, the TAC needs to be distinguished from an Extended RNC ID in an existing network.

A method for the SGSN to address a target MME address, a method for an MME to restore the Target eNB ID and a method for the MME to seek a target eNB are similar to the embodiment of FIG. 7, and are implemented according to an inverse process of the foregoing filling rule, and therefore, details are not repeatedly described herein. For example, the MME extracts the PLMN ID in the LAI of the Corresponding RNC ID to obtain a first PLMN ID or a second PLMN ID of the Target eNB ID; extracts the LAC in the LAI of the Corresponding RNC ID and the RAC to obtain the eNB ID of the Target eNB ID; and extracts the extended RNC-ID in the Corresponding RNC ID to obtain the TAC in the Selected TAI of the Target eNB ID.

The foregoing describes a part of embodiments of the present invention with reference to specific examples. However, the present invention is not limited by these specific examples as long as the selected PLMN ID, the eNB ID and the TAC are filled in the Corresponding RNC ID. Elements of the Target eNB ID are restored at the MME according to an inverse filling process.

Therefore, by using the embodiment of the present invention, the RNC may successfully convert the Target eNB ID into the Corresponding RNC ID, which well solves a problem that, because an SGSN in a network does not identify a Target eNB ID, the RNC cannot hand over a UE from a UMTS network to an LTE network.

Figure 17:
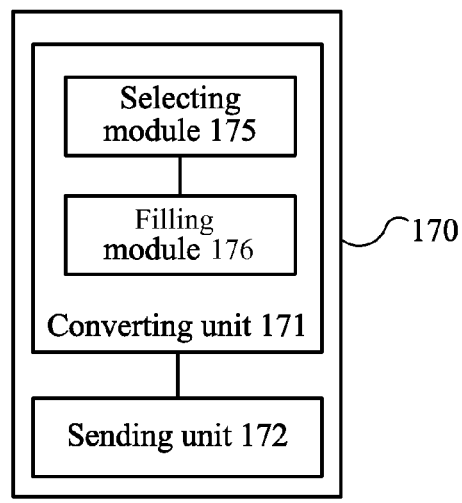
FIG. 17 is a schematic block diagram of a radio network controller according to an embodiment of the present invention.

FIG. 17 is a schematic block diagram of a radio network controller according to an embodiment of the present invention. A radio network controller 170 in FIG. 17 includes a converting unit 171 and a sending unit 172.

When an SGSN cannot identify a Target eNB ID, the converting unit 171 converts the Target eNB ID into a Corresponding RNC ID. The sending unit 172 sends a relocation request message to the SGSN, where the relocation request message carries the Corresponding RNC ID.

The converting unit 171 includes a selecting module 175 and a filling module 176. The selecting module 175 selects one of a first PLMN ID and a second PLMN ID included in the Target eNB ID. The filling module 176 fills, in the Corresponding RNC ID, a selected PLMN ID, an eNB ID included in the Target eNB ID and a TAC in a Selected TAI.

In the embodiment of the present invention, when the Target eNB ID is converted, a PLMN ID in the Target eNB ID is discarded, so that bits to be converted can be admitted into the Corresponding RNC ID, and conversion between the Target eNB ID and the Corresponding RNC ID can be implemented.

Parts of the radio network controller 170 may execute the embodiments of FIG. 3 and FIG. 7 to FIG. 16, and to avoid repetition, details are not repeatedly described.

Optionally, in one embodiment, the first PLMN ID corresponds to first three bytes of the Target eNB ID, and the second PLMN ID is the PLMN ID in the Selected TAI included in the Target eNB ID. When the first PLMN ID and the second PLMN ID are the same, the selecting module 175 selects the first PLMN ID or the second PLMN ID as the selected PLMN ID; when the first PLMN ID and the second PLMN ID are different, the selecting module 175 selects the second PLMN ID as the selected PLMN ID in order to accurately send a handover request to a core network device MME of the serving network. Definitions of the first PLMN ID and the second PLMN ID are as described in FIG. 2.

Optionally, in another embodiment, referring to FIG. 7 to FIG. 10, the filling module 176 fills in the selected PLMN ID as the PLMN ID in a location area identity LAI of the Corresponding RNC ID, fills in a TAC of the Selected TAI as an LAC in the LAI of the Corresponding RNC ID, fills in eight bits of the eNB ID as an RAC in the Corresponding RNC ID, and fills in twelve bits except the eight bits in the eNB ID as an RNC-ID in the Corresponding RNC ID or adds one to four bits to twelve bits except the eight bits in the eNB ID fills in the twelve bits added with one to four bits as an extended RNC-ID in the Corresponding RNC ID.

Optionally, in another embodiment, referring to FIG. 11 to FIG. 12, the filling module 176 fills in the selected PLMN ID as the PLMN ID in the LAI of the Corresponding RNC ID, fills in the TAC of the Selected TAI as a byte of the LAC in the LAI of the Corresponding RNC ID and an RAC, fills in eight bits of the eNB ID as another byte of the LAC in the LAI of the Corresponding RNC ID, and fills in twelve bits except the eight bits in the eNB ID as the RNC-ID in the Corresponding RNC ID or adds one to four bits to twelve bits except the eight bits in the eNB ID and fills in the twelve bits added with one to four bits as the extended RNC-ID in the Corresponding RNC ID.

Here, the eight bits in the eNB ID may be eight high-order bits or eight low-order bits, or any other eight bits in the eNB ID.

When a bit needs to be added, one to four bits may be added intensively or dispersedly in any location in front of, behind or among the twelve bits.

The one byte of the LAC in the LAI is a first byte or a second byte of the LAC, and correspondingly, the another byte of the LAC is the second byte or the first byte. Or, the one byte of the LAC may be any eight bits of the LAC, and the another byte is the remaining eight bits.

Optionally, in another embodiment, referring to FIG. 13 to FIG. 14, the filling module 176 fills the selected PLMN ID, the eNB ID and the TAC in the Corresponding RNC ID in order.

Here, the filling module 176 may fill in the foregoing three elements sequentially in any order.

Optionally, in another embodiment, referring to FIG. 15, the filling module 176 adds four bits to an eNB ID and fills in the eNB ID as the PLMN ID in the LAI of the Corresponding RNC ID, fills in the selected PLMN ID as the LAC in the LAI of the Corresponding RNC ID and the RAC, and fills in the TAC of the Selected TAI as the extended RNC-ID in the Corresponding RNC ID.

Optionally, in another embodiment, referring to FIG. 16, the filling module 176 fills in the selected PLMN ID as the PLMN ID in the LAI of the Corresponding RNC ID, adds four bits to the eNB ID, fills in the eNB ID as the LAC in the LAI of the Corresponding RNC ID and the RAC, and fills in the TAC of the Selected TAI as the extended RNC-ID in the Corresponding RNC ID.

Here, when the four bits are added to the eNB ID, the four bits may be added intensively or dispersedly in front of, behind or among the eNB ID.

In the embodiment of the present invention, when the radio network controller 170 converts the Target eNB ID, a PLMN ID in the Target eNB ID is discarded, so that bits to be converted can be admitted into the Corresponding RNC ID, and conversion between the Target eNB ID and the Corresponding RNC ID can be implemented.

Figure 18:
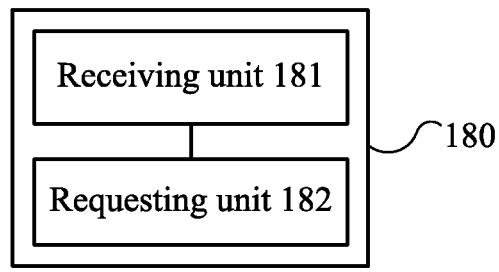
FIG. 18 is a schematic block diagram of an SGSN device according to an embodiment of the present invention.

FIG. 18 is a schematic block diagram of an SGSN device according to an embodiment of the present invention. An SGSN device 180 in FIG. 18 includes a receiving unit 181 and a requesting unit 182.

The receiving unit 181 receives a relocation request message sent by a radio network controller, where the relocation request message carries a Corresponding RNC ID, and the Corresponding RNC ID is obtained by converting a Target eNB ID, and carries a selected PLMN ID, an eNB ID included in the Target eNB ID and a TAC in a Selected TAI included in the Target eNB ID, and the selected PLMN ID is one of a first PLMN ID and a second PLMN ID included in the Target eNB ID.

The requesting unit 182 addresses a target MME according to the Corresponding RNC ID, and sends a forward relocation request message to the addressed target MME, where a target identity Target ID in the forward relocation request message carries information of the Corresponding RNC ID.

Therefore, in the embodiment of the present invention, when the Target eNB ID is converted, a PLMN ID in the Target eNB ID is discarded, so that bits to be converted can be admitted into the Corresponding RNC ID, and conversion between the Target eNB ID and the Corresponding RNC ID can be implemented.

Meanwhile, an SGSN may address a corresponding target MME according to the Corresponding RNC ID, and complete sending the forward relocation request message. A Target ID cell in a forward relocation request is consistent with content of the Corresponding RNC ID, and therefore, an MME may identity the Corresponding RNC ID, which ensures smooth execution of a handover procedure.

For example, the first PLMN ID corresponds to first three bytes of the Target eNB ID, and the second PLMN ID is a PLMN ID in the Selected TAI. The two PLMN IDs may be same, and may also be different. When the first PLMN ID and the second PLMN ID are the same, the selected PLMN ID is the first PLMN ID or the second PLMN ID; when the first PLMN ID and the second PLMN ID are different, the selected PLMN ID may be the second PLMN ID in order to accurately send a handover request to a core network device MME of the serving network.

Figure 19:
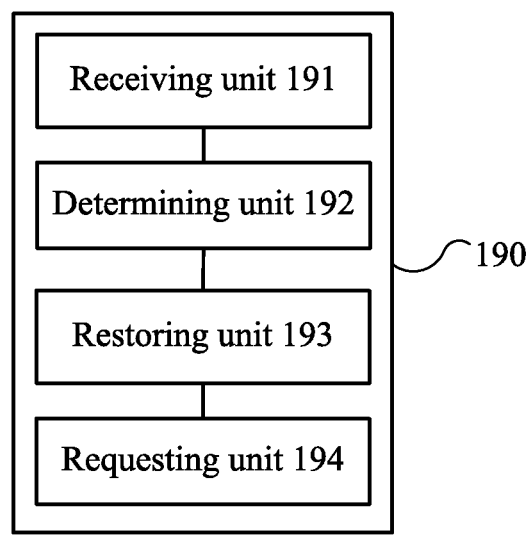
FIG. 19 is a schematic block diagram of an MME device according to an embodiment of the present invention.

FIG. 19 is a schematic block diagram of an MME device according to an embodiment of the present invention. An MME device 190 in FIG. 19 includes a receiving unit 191, a determining unit 192, a restoring unit 193 and a requesting unit 194.

The receiving unit 191 receives a forward relocation request message sent by an SGSN. The determining unit 192 determines whether a Target ID in the forward relocation request message is a Corresponding RNC ID, where the Corresponding RNC ID is obtained by converting a Target eNB ID, and carries a selected PLMN ID, an eNB ID included in the Target eNB ID and a TAC in a Selected TAI included in the Target eNB ID, and the selected PLMN ID is one of a first PLMN ID and a second PLMN ID included in the Target eNB ID.

When determining that the Target ID is the Corresponding RNC ID, the restoring unit 193 obtains a restored Target eNB ID according to the Corresponding RNC ID. The requesting unit 194 addresses a target eNB according to the restored Target eNB ID, and sends a handover request message to the addressed target eNB.

Therefore, in the embodiment of the present invention, when the Target eNB ID is converted, a PLMN ID in the Target eNB ID is discarded, so that bits to be converted can be admitted into the Corresponding RNC ID, and conversion between the Target eNB ID and the Corresponding RNC ID can be implemented.

Meanwhile, the MME can identify the Corresponding RNC ID, restore elements of the Target eNB ID from the Corresponding RNC ID, address a corresponding target eNB according to the Corresponding RNC ID, and complete sending the handover request message, which ensures smooth execution of a handover procedure.

A process for the restoring unit 193 to obtain elements of the restored Target eNB ID is an inverse process for the filling processing performed by the filling module 176 in FIG. 17, and therefore, details are not repeatedly described herein.

For example, the first PLMN ID corresponds to first three bytes of the Target eNB ID, and the second PLMN ID is a PLMN ID in the Selected TAI. The two PLMN IDs may be same, and may also be different. When the first PLMN ID and the second PLMN ID are the same, the selected PLMN ID is the first PLMN ID or the second PLMN ID; when the first PLMN ID and the second PLMN ID are different, the selected PLMN ID may be the second PLMN ID in order to accurately send a handover request to a core network device MME of the serving network.

Optionally, in one embodiment, the determining unit 192 determines, according to a bit corresponding to the TAC, or a bit corresponding to the eNB ID and/or added one to four bits in the Target RNC ID, whether the Target ID is the Corresponding RNC ID. When the TAC or the eNB ID is planned, its value needs to be distinguished from a value of an element (such as a PLMN ID, an LAC, an RAC, an RNC-ID or an extended RNC-ID) represented by a corresponding bit in a Target RNC ID, so as to enable the MME to distinguish whether the Target RNC ID is the Corresponding RNC ID or a real RNC ID.

Optionally, in another embodiment, the restoring unit 193 obtains, by extracting, a PLMN ID in a location area identity LAI in a Corresponding RNC ID to obtain a first PLMN ID or a second PLMN ID of a Target eNB ID; extracts a location area code LAC in the LAI of the Corresponding RNC ID to obtain the TAC in the Selected TAI of the Target eNB ID; extracts a routing area code RAC in the Corresponding RNC ID to obtain eight bits in the eNB ID of the Target eNB ID; extracts a radio network controller identity RNC-ID in the Corresponding RNC ID, or an extended RNC-ID in the Corresponding RNC ID to obtain twelve bits except the eight bits in the eNB ID of the Target eNB ID.

Optionally, in another embodiment, the restoring unit 193 extracts the PLMN ID in the LAI of the Corresponding RNC ID to obtain the first PLMN ID or the second PLMN ID of the Target eNB ID; fills in the TAC of the Selected TAI as a byte of the LAC in the LAI of the Corresponding RNC ID and the RAC; extracts another byte of the LAC in the LAI of the Corresponding RNC ID to obtain eight bits in the eNB ID of the Target eNB ID; and extracts the RNC-ID in the Corresponding RNC ID, or the extended RNC-ID in the Corresponding RNC ID to obtain twelve bits except the eight bits in the eNB ID of the Target eNB ID.

Optionally, in another embodiment, the restoring unit 193 extracts the first PLMN ID or the second PLMN ID, the eNB ID, and the TAC in order.

Optionally, in another embodiment, the restoring unit 193 extracts the PLMN ID in the LAI of the Corresponding RNC ID to obtain the eNB ID of the Target eNB ID; extracts the LAC in the LAI of the Corresponding RNC ID and the RAC to obtain the Target eNB ID; and extracts the extended RNC-ID in the Corresponding RNC ID to obtain the TAC in the Selected TAI of the Target eNB ID.

Optionally, in another embodiment, the restoring unit 193 extracts the PLMN ID in the LAI of the Corresponding RNC ID to obtain the first PLMN ID or the second PLMN ID of the Target eNB ID; extracts the LAC in the LAI of the Corresponding RNC ID and the RAC to obtain the eNB ID of the Target eNB ID; and extracts the extended RNC-ID in the Corresponding RNC ID to obtain the TAC in the Selected TAI of the Target eNB ID.

A communication system according to an embodiment of the present invention may include the radio network controller 170, the SGSN device 180 or the MME device 190.

A person of ordinary skill in the art may be aware that units and algorithm steps of each example described in combination with the embodiments disclosed herein may be implemented by electronic hardware, or a combination of computer software and electronic hardware. Whether the functions are performed in a hardware or software manner depends on particular applications and design constraint conditions of the technical solutions. A person skilled in the art may use different methods to implement the described functions for each particular application, but it should not be considered that the implementation goes beyond the scope of the present invention.

A person skilled in the art may clearly understand that, for the purpose of convenient and brief description, for a detailed working process of the foregoing system, apparatus, and unit, reference may be made to the corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, dividing of the units is merely a type of logical function dividing, and there may be other dividing manners during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such understanding, the technical solutions of the present invention essentially, or the part contributing to the prior art, or a part of the technical solutions may be embodied in a form of a software product. The computer software product is stored in a storage medium, and includes several instructions for instructing a computer device (which may be a personal computer, a server, or a network device, or the like) to perform all or a part of the steps of the methods described in the embodiments of the present invention. The foregoing storage medium includes any medium that is capable of storing program codes, such as a USB flash disk, a removable hard disk, a read-only memory (ROM), a random access memory (RAM), a magnetic disk, or an optical disk.

The foregoing description is merely specific implementation manners of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for a handover from a universal mobile telecommunications system (UMTS) to long term evolution (LTE), the method comprising:
   when a serving general packet radio service support node (SGSN) cannot identify a target long term evolution base station identity (Target eNB ID), converting the Target eNB ID into a corresponding radio network controller identity Corresponding RNC ID; and
   sending a relocation request message to the SGSN, wherein the relocation request message carries the Corresponding RNC ID,
   wherein converting the Target eNB ID into a Corresponding RNC ID comprises:
      selecting one of a first public land mobile network identity (PLMN ID) and a second PLMN ID comprised in the Target eNB ID; and
      filling, in the Corresponding RNC ID, a selected PLMN ID, a long term evolution base station identity eNB ID comprised in the Target eNB ID, and a tracking area code TAC in a selected tracking area identity Selected TAI comprised in the Target eNB ID.

2. The method according to claim 1, wherein the first PLMN ID corresponds to a first three bytes of the Target eNB ID, and the second PLMN ID is a PLMN ID in the Selected TAI,
   wherein selecting one of the first PLMN ID and the second PLMN ID comprised in the Target eNB ID further comprises:
   selecting the first PLMN ID or the second PLMN ID as the selected PLMN ID when the first PLMN ID and the second PLMN ID are the same; and
   selecting the second PLMN ID as the selected PLMN ID when the first PLMN ID and the second PLMN ID are different.

3. The method according to claim 2, wherein filling the selected PLMN ID, the eNB ID comprised in the Target eNB ID, and the TAC in a Selected TAI comprises:
   filling in the selected PLMN ID as a PLMN ID in a location area identity LAI of the Corresponding RNC ID;
   filling in the TAC in the Selected TAI as a location area code LAC in the LAI of the Corresponding RNC ID;
   filling in eight bits of the eNB ID as a routing area code RAC in the Corresponding RNC ID; and
   filling in twelve bits except the eight bits of the eNB ID as a radio network controller identity RNC-ID in the Corresponding RNC ID; or
   adding one to four bits to twelve bits except the eight bits in the eNB ID and filling in the eNB ID as an extended RNC-ID in the Corresponding RNC ID.

4. The method according to claim 3, wherein:
   the eight bits in the eNB ID are eight high-order bits in the eNB ID; or
   the eight bits in the eNB ID are eight low-order bits in the eNB ID.

5. The method according to claim 3, wherein adding one to four bits to twelve bits except the eight bits in the eNB ID further comprises:
   adding the one to four bits in front of the twelve bits; or
   adding the one to four bits behind the twelve bits.

6. The method according to claim 2, wherein filling the selected PLMN ID, the eNB ID comprised in the Target eNB ID, and the TAC in a Selected TAI further comprises:
   filling in the selected PLMN ID as a PLMN ID in an LAI of the Corresponding RNC ID;
   filling in the TAC in the Selected TAI as one byte of an LAC in the LAI of the Corresponding RNC ID and an RAC;
   filling in eight bits of the eNB ID as another byte of the LAC in the LAI of the Corresponding RNC ID; and
   filling in twelve bits except the eight bits of the eNB ID as a radio network controller identity RNC-ID in the Corresponding RNC ID, or adding one to four bits to twelve bits except the eight bits in the eNB ID and filling in the eNB ID as an extended RNC-ID in the Corresponding RNC ID.

7. The method according to claim 6, wherein the one byte of the LAC in the LAI is a first byte or a second byte of the LAC.

8. The method according to claim 2, wherein filling the selected PLMN ID, the eNB ID comprised in the Target eNB ID, and the TAC in a Selected TAI further comprises:
   filling the selected PLMN ID, the eNB ID and the TAC in the Corresponding RNC ID in order.

9. The method according to claim 2, wherein filling the selected PLMN ID, the eNB ID comprised in the Target eNB ID, and the TAC in a Selected TAI further comprises:
   adding four bits to the eNB ID and filling in the eNB ID as a PLMN ID in an LAI of the Corresponding RNC ID;
   filling in the selected PLMN ID as an LAC in the LAI of the Corresponding RNC ID and an RAC; and
   filling in the TAC in the Selected TAI as an extended RNC-ID in the Corresponding RNC ID.

10. The method according to claim 9, wherein a process for adding four bits to the eNB ID comprises:
    adding four bits in front of the eNB ID; or
    adding four bits behind the eNB ID.

11. The method according to claim 2, wherein filling the selected PLMN ID, the eNB ID comprised in the Target eNB ID, and the TAC in a Selected TAI further comprises:
    filling in the selected PLMN ID as a PLMN ID in an LAI of the Corresponding RNC ID;
    adding four bits to the eNB ID and filling in the eNB ID as an LAC in the LAI of the Corresponding RNC ID and an RAC; and
    filling in the TAC in the Selected TAI as an extended RNC-ID in the Corresponding RNC ID.

12. The method according to claim 1, wherein before the converting the Target eNB ID into a Corresponding RNC ID, the method further comprises determining whether the SGSN identifies the Target eNB ID through a preset information element in Iu interface mutual information or through SGSN information configured in a background.

13. A method for a handover from a universal mobile telecommunications system (UMTS) to long term evolution (LTE), the method comprising:
    receiving a relocation request message sent by a radio network controller, wherein the relocation request message carries a corresponding radio network controller identity (RNC ID) obtained by converting a target long term evolution base station identity Target eNB ID, the corresponding RNC ID carrying a selected public land mobile network identity (PLMN ID), a long term evolution base station identity (eNB ID) comprised in the Target eNB ID, and a tracking area code TAC in a selected tracking area identity (TAI) comprised in the Target eNB ID, wherein the selected PLMN ID is one of a first PLMN ID and a second PLMN ID comprised in the Target eNB ID;

addressing a target mobility management entity MME according to the Corresponding RNC ID; and sending a forward relocation request message to the addressed target MME, wherein a target identity Target ID in the forward relocation request message carries information of the Corresponding RNC ID.

14. A method for a handover from a universal mobile telecommunications system (UMTS) to long term evolution (LTE), the method comprising:

receiving a forward relocation request message sent by a serving general packet radio service support node SGSN;

determining that a target identity (Target ID) in the forward relocation request message is a corresponding radio network controller identity (RNC ID), wherein the corresponding RNC ID is obtained by converting a target long term evolution base station identity Target eNB ID, and carries a selected public land mobile network identity PLMN ID, a long term evolution base station identity eNB ID comprised in the Target eNB ID, and a tracking area code TAC in a selected tracking area identity Selected TAI comprised in the Target eNB ID, wherein the selected PLMN ID is one of a first PLMN ID and a second PLMN ID comprised in the Target eNB ID;

obtaining a restored Target eNB ID according to the Corresponding RNC ID;

addressing a target eNB according to the restored Target eNB ID; and sending a handover request message to the addressed target eNB.

15. The method according to claim 14, wherein determining whether a Target RNC ID is a Corresponding RNC ID comprises:

determining whether the Target RNC ID is the Corresponding RNC ID according to a bit corresponding to the TAC or a bit corresponding to the eNB ID and/or added one to four bits in the Target RNC ID.

16. The method according to claim 14, wherein the first PLMN ID corresponds to first three bytes of the Target eNB ID, and the second PLMN ID is a PLMN ID in the Selected TAI, and the selected PLMN ID is the first PLMN ID or the second PLMN ID when the first PLMN ID and the second PLMN ID are the same; and the selected PLMN ID is the second PLMN ID when the first PLMN ID and the second PLMN ID are different.

17. The method according to claim 16, wherein obtaining the restored Target eNB ID according to the Corresponding RNC ID comprises:

extracting a PLMN ID in a location area identity LAI of the Corresponding RNC ID to obtain the first PLMN ID or the second PLMN ID of the Target eNB ID;

extracting a location area code LAC in the LAI of the Corresponding RNC ID to obtain the TAC in the Selected TAI in the Target eNB ID;

extracting a routing area code RAC in the Corresponding RNC ID to obtain eight bits in the eNB ID of the Target eNB ID; and extracting a radio network controller identity RNC-ID in the Corresponding RNC ID, or an extended RNC-ID in the Corresponding RNC ID to obtain twelve bits except the eight bits in the eNB ID of the Target eNB ID.

18. The method according to claim 16, wherein obtaining the restored Target eNB ID according to the Corresponding RNC ID further comprises:

extracting a PLMN ID in an LAI of the Corresponding RNC ID to obtain the first PLMN ID or the second PLMN ID of the Target eNB ID;

extracting one byte of an LAC in the LAI of the Corresponding RNC ID and an RAC to obtain the TAC in the Selected TAI in the Target eNB ID;

extracting another byte of the LAC in the LAI of the Corresponding RNC ID to obtain eight bits in the eNB ID of the Target eNB ID; and extracting a radio network controller identity RNC-ID in the Corresponding RNC ID, or an extended RNC-ID in the Corresponding RNC ID to obtain twelve bits except the eight bits in the eNB ID of the Target eNB ID.

19. The method according to claim 16, wherein obtaining the restored Target eNB ID according to the Corresponding RNC ID comprises obtaining, by extracting, the first PLMN ID or the second PLMN ID, the eNB ID, and the TAC in order.

20. The method according to claim 16, wherein obtaining the restored Target eNB ID according to the Corresponding RNC ID comprises:

extracting a PLMN ID in an LAI of the Corresponding RNC ID to obtain the eNB ID of the Target eNB ID;

extracting an LAC in the LAI of the Corresponding RNC ID and an RAC to obtain the Target eNB ID; and extracting an extended RNC-ID in the Corresponding RNC ID to obtain the TAC in the Selected TAI of the Target eNB ID.

21. The method according to claim 16, wherein obtaining the restored Target eNB ID according to the Corresponding RNC ID further comprises:

extracting a PLMN ID in an LAI of the Corresponding RNC ID to obtain the first PLMN ID or the second PLMN ID of the Target eNB ID;

extracting an LAC in the LAI of the Corresponding RNC ID and an RAC to obtain the eNB ID of the Target eNB ID; and extracting an extended RNC-ID in the Corresponding RNC ID to obtain the TAC in the Selected TAI of the Target eNB ID.

22. A radio network controller, comprising:

a converting unit, configured to convert a target long term evolution base station identity (Target eNB ID) into a corresponding radio network controller identity (Corresponding RNC ID) when a serving general packet radio service support node (SGSN) cannot identify the Target eNB ID; and a sending unit, configured to send a relocation request message to the SGSN, wherein the relocation request message carries the Corresponding RNC ID, wherein the converting unit comprises:

a selecting module, configured to select one of a first public land mobile network identity (PLMN ID) and a second PLMN ID comprised in the Target eNB ID; and a filling module, configured to fill, in the Corresponding RNC ID, the PLMN ID selected by the selecting module, a long term evolution base station identity eNB ID comprised in the Target eNB ID, and a tracking area code TAC in a selected tracking area identity Selected TAI comprised in the Target eNB ID.

23. The radio network controller according to claim 22, wherein the first PLMN ID corresponds to first three bytes of the Target eNB ID, and the second PLMN ID is a PLMN ID in the Selected TAI; and wherein the selecting module is configured to, when the first PLMN ID and the second PLMN ID are the same, select the first PLMN ID or the second PLMN ID as the selected PLMN ID, and when the first PLMN ID and the second PLMN ID are different, select the second PLMN ID as the selected PLMN ID.

24. The radio network controller according to claim 22, wherein the filling module is configured to fill in the selected PLMN ID as a PLMN ID in a location area identity LAI of the Corresponding RNC ID, to fill in the TAC in the Selected TAI as a location area code LAC in the LAI of the Corresponding RNC ID, to fill in eight bits in the eNB ID as a routing area code RAC in the Corresponding RNC ID, and to fill in twelve bits except the eight bits in the eNB ID as a radio network controller identity RNC-ID in the Corresponding RNC ID, or to add one to four bits to twelve bits except the eight bits in the eNB ID and fill in the eNB ID as an extended RNC-ID in the Corresponding RNC ID.

25. The radio network controller according to claim 22, wherein the filling module is specifically configured to fill in the selected PLMN ID as a PLMN ID in an LAI of the Corresponding RNC ID, to fill in the TAC in the Selected TAI as one byte of an LAC in the LAI of the Corresponding RNC ID and an RAC, to fill in eight bits in the eNB ID as another byte of the LAC in the LAI of the Corresponding RNC ID, and to fill in twelve bits except the eight bits in the eNB ID as a radio network controller identity RNC-ID in the Corresponding RNC ID, or to add one to four bits to twelve bits except the eight bits in the eNB ID and fill in the eNB ID as an extended RNC-ID in the Corresponding RNC ID.

26. The radio network controller according to claim 22, wherein the filling module is configured to fill the selected PLMN ID, the eNB ID and the TAC in the Corresponding RNC ID in order.

27. The radio network controller according to claim 22, wherein the filling module is configured to add four bits to the eNB ID and fill in the eNB ID as a PLMN ID in an LAI of the Corresponding RNC ID, to fill in the selected PLMN ID as an LAC in the LAI of the Corresponding RNC ID and an RAC, and to fill in the TAC in the Selected TAI as an extended RNC-ID in the Corresponding RNC ID.

28. The radio network controller according to claim 22, wherein the filling module is configured to fill in the selected PLMN ID as a PLMN ID in an LAI of the Corresponding RNC ID, to add four bits to the eNB ID and to fill in the eNB ID as an LAC in the LAI of the Corresponding RNC ID and an RA, and to fill in the TAC in the Selected TAI as an extended RNC-ID in the Corresponding RNC ID.

29. A serving general packet radio service support node (SGSN) device, comprising:

a receiving unit, configured to receive a relocation request message sent by a radio network controller, wherein the relocation request message carries a corresponding radio network controller identity (Corresponding RNC ID), and the Corresponding RNC ID is obtained by converting a target long term evolution base station identity (Target eNB ID), and carries a selected public land mobile network identity (PLMN ID), a long term evolution base station identity (eNB ID) comprised in the Target eNB ID, and a tracking area code (TAC) in a selected tracking area identity (Selected TAI) comprised in the Target eNB ID, wherein the selected PLMN ID is one of a first PLMN ID and a second PLMN ID comprised in the Target eNB ID; and a requesting unit, configured to address a target mobility management entity MME according to the Corresponding RNC ID, and to send a forward relocation request message to the addressed target MME, wherein a target identity Target ID in the forward relocation request message carries information of the Corresponding RNC ID.

30. A mobility management entity (MME) device, comprising:

a receiving unit, configured to receive a forward relocation request message sent by a serving general packet radio service support node (SGSN);

a determining unit, configured to determine whether a target identity (Target ID) in the forward relocation request message received by the receiving unit is a corresponding radio network controller identity (Corresponding RNC ID), wherein the Corresponding RNC ID is obtained by converting a target long term evolution base station identity (Target eNB ID), and carries a selected public land mobile network identity (PLMN ID), a long term evolution base station identity (eNB ID) comprised in the Target eNB ID, and a tracking area code (TAC) in a selected tracking area identity (Selected TAI) comprised in the Target eNB ID, wherein the selected PLMN ID is one of a first PLMN ID and a second PLMN ID comprised in the Target eNB ID;

a restoring unit, configured to obtain a restored Target eNB ID according to the Corresponding RNC ID when the determining unit determines that the Target ID is the Corresponding RNC ID; and a requesting unit, configured to address a target eNB according to the Target eNB ID restored by the restoring unit, and to send a handover request message to the addressed target eNB.

31. The MME device according to claim 30, wherein the determining unit is configured to determine whether the Target RNC ID is the Corresponding RNC ID according to a bit corresponding to the TAC, or a bit corresponding to the eNB ID and/or added one to four bits in the Target RNC ID.

32. The MME device according to claim 30, wherein the restoring unit is configured to extract a PLMN ID in a location area identity LAI of the Corresponding RNC ID to obtain the first PLMN ID or the second PLMN ID of the Target eNB ID, to extract a location area code (LAC) in the LAI of the Corresponding RNC ID to obtain the TAC in the Selected TAI of the Target eNB ID, to extract a routing area code RAC in the Corresponding RNC ID to obtain eight bits in the eNB ID of the Target eNB ID, and to extract a radio network controller identity RNC-ID in the Corresponding RNC ID, or an extended RNC-ID in the Corresponding RNC ID to obtain twelve bits except the eight bits in the eNB ID of the Target eNB ID.

33. The MME device according to claim 30, wherein the restoring unit is specifically configured to extract a PLMN ID in an LAI of the Corresponding RNC ID to obtain the first PLMN ID or the second PLMN ID of the Target eNB ID, to fill in the TAC in the Selected TAI as one byte of an LAC in the LAI of the Corresponding RNC ID and an RAC, to extract another byte of the LAC in the LAI of the Corresponding RNC ID to obtain eight bits in the eNB ID of the Target eNB ID, and to extract an RNC-ID in the Corresponding RNC ID, or an extended RNC-ID in the Corresponding RNC ID to obtain twelve bits except the eight bits in the eNB ID of the Target eNB ID.

34. The MME device according to claim 30, wherein the restoring unit is configured to obtain, by extracting, the first PLMN ID or the second PLMN ID, the eNB ID, and the TAC in order.

35. The MME device according to claim 30, wherein the restoring unit is configured to extract a PLMN ID in an LAI of the Corresponding RNC ID to obtain the eNB ID of the Target eNB ID, to extract an LAC in the LAI of the Corresponding RNC ID and an RAC to obtain the Target eNB ID, and to extract an extended RNC-ID in the Corresponding RNC ID to obtain the TAC in the Selected TAI of the Target eNB ID.

36. The MME device according to claim 30, wherein the restoring unit is specifically configured to extract a PLMN ID in an LAI of the Corresponding RNC ID to obtain the first PLMN ID or the second PLMN ID of the Target eNB ID, to extract an LAC in the LAI of the Corresponding RNC ID and an RAC to obtain the eNB ID of the Target eNB ID, and to extract an extended RNC-ID in the Corresponding RNC ID to obtain the TAC in the Selected TAI of the Target eNB ID.

* * * * *